United States Patent
Eto et al.

(10) Patent No.: US 8,861,056 B2
(45) Date of Patent: Oct. 14, 2014

(54) VOLUME HOLOGRAM TRANSFER FOIL, VOLUME HOLOGRAM LAMINATE, AND PRODUCTION METHOD THEREOF

(71) Applicant: Dai Nippon Printing Co., Ltd, Tokyo-to (JP)

(72) Inventors: Koji Eto, Tokyo-to (JP); Minoru Azakami, Tokyo-to (JP); Kazutoshi Awano, Tokyo-to (JP); Kenji Ueda, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 14/023,960

(22) Filed: Sep. 11, 2013

(65) Prior Publication Data

US 2014/0016167 A1    Jan. 16, 2014

Related U.S. Application Data

(62) Division of application No. 12/140,457, filed on Jun. 17, 2008, now Pat. No. 8,559,084.

(30) Foreign Application Priority Data

Jun. 19, 2007  (JP) ................ 2007-161854
Jun. 21, 2007  (JP) ................ 2007-164328

(51) Int. Cl.
  *G03H 1/00*    (2006.01)
(52) U.S. Cl.
  USPC .............................. 359/2; 283/86
(58) Field of Classification Search
  USPC ............ 359/567, 1–35; 378/34–36; 427/160; 430/1–2; 156/99–103; 250/372–373
  See application file for complete search history.

(56) References Cited

U.S. PATENT DOCUMENTS

| | | |
|---|---|---|
| 4,856,857 A | 8/1989 | Takeuchi et al. |
| 7,090,935 B2 | 8/2006 | Azakami et al. |
| 2002/0015897 A1 | 2/2002 | Toshine et al. |
| 2003/0134105 A1 | 7/2003 | Toshine et al. |
| 2005/0175815 A1 | 8/2005 | Wild et al. |
| 2005/0191560 A1* | 9/2005 | Otaki et al. ............. 430/1 |
| 2006/0275671 A1 | 12/2006 | Eto et al. |

FOREIGN PATENT DOCUMENTS

| | | |
|---|---|---|
| EP | 1 346 844 A1 | 9/2003 |
| GB | 2 347 646 A | 9/2000 |
| JP | 61-272772 A | 12/1986 |
| JP | 2000-015939 A | 1/2000 |

(Continued)

OTHER PUBLICATIONS

European Search Report dated Oct. 5, 2009 Appln. EP08 15 8508.

(Continued)

*Primary Examiner* — Jennifer L. Doak
(74) *Attorney, Agent, or Firm* — Ladas & Parry LLP

(57) ABSTRACT

A major object of the present invention is to provide a volume hologram transfer foil that gives a volume hologram laminate higher in antiforgery function.
The present invention achieves the object by providing a volume hologram transfer foil comprising: a substrate, a volume hologram layer carrying a recorded volume hologram that is formed on the substrate, and an image forming layer carrying a formed image and a heat seal layer containing a thermoplastic resin that are formed on the volume hologram layer, and comprising no reflective layer having a function to reflect light.

4 Claims, 18 Drawing Sheets

(56) References Cited

FOREIGN PATENT DOCUMENTS

| | | |
|---|---|---|
| JP | 2003-220662 A | 8/2003 |
| JP | 2003-316239 A | 11/2003 |
| JP | 2004-122690 A | 4/2004 |
| JP | 2005-003809 A | 1/2005 |
| JP | 2005-338656 A | 12/2005 |
| JP | 2007-11319 A | 1/2007 |

OTHER PUBLICATIONS

USPTO RR mailed Sep. 29, 2010 in connection with U.S. Appl. No. 12/140,457.

USPTO OA email dated Oct. 25, 2012 in connection with U.S. Appl. No. 12/140,457.

USPTO NFOA dated Jan. 28, 2011 in connection with U.S. Appl. No. 12/140,457.

USPTO FOA dated Oct. 14, 2011 in connection with U.S. Appl. No. 12/140,457.

USPTO NFOA dated Oct. 25, 2012 in connection with U.S. Appl. No. 12/140,457.

USPTO NOA mailed Jun. 13, 2013 in connection with U.S. Appl. No. 12/140,457.

\* cited by examiner

VOLUME HOLOGRAM TRANSFER FOIL, VOLUME HOLOGRAM LAMINATE, AND PRODUCTION METHOD THEREOF

BACKGROUND OF THE INVENTION

1. Field of the Invention

The present invention relates to a volume hologram layer-transferring foil for use in transferring a volume hologram layer onto a transfer-receiving member, a method of producing a volume hologram laminate using the same, and others.

2. Description of the Related Art

Hologram is an object of the wave front of an object light recorded on a photosensitive material as interference fringe by interference of two lights (object and reference beams) of the same wavelength, and, if a light at the same wavelength and of the same angle as the reference beam used during interference fringe recording is irradiated, a diffraction phenomenon caused by the interference fringe is induced, regenerating the wave front identical with that of the original object light. The hologram, which has many advantages such as favorable appearance and relative difficulty in copying, has been used, for example, in security applications. In particular, it is used widely on plastic cards such as credit card and cash card, mainly for prevention of copying and for favorable appearance in design.

Such holograms may be divided into several groups, typically into surface relief hologram and volume type hologram, depending on the method of recording interference fringe. The surface relief hologram is a hologram which is recorded by a fine convexo-concave pattern engraved on the surface of a hologram layer. On the other hand, the volume type hologram is a hologram wherein the interference fringe generated by light interference is recorded as fringes different in refractive index three-dimensionally in the thickness direction of the hologram layer. In particular, the volume type hologram, in which a hologram image is recorded, based on the difference in refractive index of the material, has an advantage that it is more difficult to copy than the relief hologram, and thus, is expected to find application as an antiforgery means, for example, for use on valuable stock certificates and credit cards.

Examples of the known methods of engraving a hologram on valuable stock certificate, card or the like, when the hologram is used for purposes such as the means of improving appearance and preventing forgery, include a method of weaving slit-shaped holograms therein and a method of embedding a hologram in a medium in the state visually recognizable from outside, but generally used is a method of bonding the hologram onto a particular position. In particular, a method of transferring a hologram from a hologram transfer foil carrying a hologram previously formed on any substrate and thus bonding the hologram onto a particular position is used widely as a simple and easy method.

The hologram transfer foil is a material in the configuration comprising a substrate, a hologram-carrying hologram layer and a thermally adhesive heat seal layer formed thereon in that order, and the hologram layer is transferred onto a transfer-receiving member via the heat seal layer. Such hologram transfer foils are disclosed, for example, in Japanese Patent Application Laid-Open Nos. 2003-316239 and 2005-3809.

Such a hologram, which is difficult to copy, has been used as an antiforgery means in various applications; but methods facilitating copying of the hologram are becoming available recently, and simple use of a hologram is pointed out to be insufficient as an antiforgery means. For that reason, there is an increasing need for a hologram transfer foil that gives a hologram improved in antiforgery function and thus insecurity.

SUMMARY OF THE INVENTION

A major object of the present invention, which was made under the circumstances above, is to provide a volume hologram transfer foil giving a volume hologram laminate superior in antiforgery function.

To solve the problems above, the present invention provides a volume hologram transfer foil, comprising: a substrate, a volume hologram layer carrying a recorded volume hologram that is formed on the substrate, an image forming layer carrying a formed image and a heat seal layer containing a thermoplastic resin that are formed on the volume hologram layer, and further comprising no reflective layer having a function to reflect light.

Because the volume hologram transfer foil according to the present invention has the volume hologram layer as well as the image forming layer, it becomes possible to transfer the volume hologram layer with the image forming layer during production of a volume hologram laminate by using the volume hologram transfer foil according to the present invention and thus to give a volume hologram laminate further superior in antiforgery function.

In addition, because the image forming layer is formed at a side closer to the heat seal layer in the present invention, it becomes possible to reduce forming of the irregularity on the surface of the volume hologram laminate caused by the image forming layer formation, during production of a volume hologram laminate by using the volume hologram transfer foil according to the present invention. Accordingly, the volume hologram transfer foil according to the present invention makes it more difficult to forge the image formed on the image forming layer and thus gives a volume hologram laminate further superior in antiforgery function.

Further, because a volume hologram layer carrying a recorded volume hologram is used as the hologram-recorded layer in the present invention, the relief hologram, if used, does not demand a commonly-used reflective layer. Thus according to the present invention, the visibility of the image formed on the image forming layer is not impaired, thus allowing production of a volume hologram laminate superior in design appearance. In addition, although the reflective layer, which has normally been formed for example by vapor deposition, inevitably lead to increase in production cost, the present invention, which does not demand such a reflective layer, can eliminate such an additional production cost. For example when a transfer foil having a volume hologram layer is applied onto a hologram-receiving medium, even when an image or the like is formed on the face of the hologram layer opposite from the viewing point, the image is displayed more distinctively.

For the reasons above, the present invention provides a volume hologram transfer foil giving a volume hologram laminate higher in antiforgery function.

In the present invention, the image forming layer is preferably a fluorescent-image forming layer carrying an image formed with a fluorescent material emitting fluorescence by absorbing ultraviolet ray. Because such a fluorescent-image forming layer is used as the image forming layer, it is possible to make the presence of the image forming layer less noticeable from outside unless it is irradiated for example with ultraviolet ray, and thus, to produce a volume hologram laminate further superior in antiforgery function by using the volume hologram transfer foil according to the present invention.

Additionally in the present invention, the image forming layer is preferably an optically-variable-image forming layer carrying an image formed by an optically variable material changing its color by viewing angle. It is because, when such an optically-variable-image forming layer is used as the image forming layer, it becomes possible to produce a volume hologram laminate further superior in antiforgery function by using the volume hologram transfer foil according to the present invention.

Also in the present invention, a peelable over protection layer is formed between the volume hologram layer and the substrate. It is because, when the peelable over protection layer is formed, it is possible to adjust the adhesiveness between the substrate and the volume hologram layer, and thus, to improve the peelability of the volume hologram layer during production of a volume hologram laminate by transfer of the volume hologram layer from the volume hologram transfer foil according to the present invention. Because the peelable over protection layer is transferred with the volume hologram layer during production of a volume hologram laminate by using the volume hologram layer-transferring foil according to the present invention, it is also possible to protect the transferred volume hologram layer with the peelable over protection layer.

The present invention provides a volume hologram laminate, comprising: a transfer-receiving member, an image forming layer carrying a formed image and a heat seal layer containing a thermoplastic resin that are formed on the transfer-receiving member, and a volume hologram layer carrying a recorded volume hologram formed on the image forming layer and the heat seal layer.

According to the present invention, in which the volume hologram layer and the image forming layer are used, it is possible to obtain a volume hologram laminate superior in antiforgery function.

Also in the present invention, since the image forming layer is formed at a side closer to the heat seal layer than the volume hologram layer, it is possible to reduce formation of the irregularity on the surface of the volume hologram laminate of the present invention caused by formation of the image forming layer. Thus, according to the present invention, it is possible to make the image formed on the image forming layer less easily forged and to obtain a volume hologram laminate further superior in antiforgery function.

The present invention further provides a method of producing a volume hologram transfer foil, comprising: a volume hologram layer forming step of using a substrate and forming a volume hologram layer carrying a recorded volume hologram on the substrate, and a layer stack step of stacking an image forming layer and a heat seal layer containing a thermoplastic resin onto the volume hologram layer.

According to the present invention, it is possible to produce a volume hologram transfer foil having an image forming layer and thus to produce a volume hologram transfer foil giving a volume hologram laminate superior in antiforgery function.

The present invention still further provides a method of producing a hologram laminate, comprising: a transfer-receiving member-bonding step of using the volume hologram transfer foil mentioned above and bonding a transfer-receiving member onto the heat seal layer of the volume hologram transfer foil, and a substrate peeling step of peeling off the substrate of the volume hologram transfer foil.

According to the present invention, it is possible to produce a volume hologram laminate superior in antiforgery function by using the volume hologram transfer foil according to the present invention.

The present invention further provides a method of producing a volume hologram laminate, characterized by using: a transfer hologram laminate comprising a substrate, a volume hologram layer carrying a recorded volume hologram that is formed on the substrate, and a heat seal layer containing a thermoplastic resin that is formed on the volume hologram layer; and a transfer laminate comprising a transfer-receiving member, and an image forming layer carrying a formed image that is formed on the transfer-receiving member, and further characterized by comprising: a bonding step of bonding the transfer hologram laminate to the transfer laminate so as the heat seal layer of the transfer hologram laminate contacts to the image forming layer of the transfer laminate, and a substrate peeling step of peeling off the substrate of the transfer hologram laminate.

The present invention also provides a method of producing a volume hologram laminate, characterized by using: a transfer hologram laminate comprising a substrate and a volume hologram layer carrying a volume hologram that is formed on the substrate; and a transfer laminate comprising a transfer-receiving member, and a heat seal layer containing a thermoplastic resin and an image forming layer carrying a formed image that are formed on the transfer-receiving member, and further characterized by comprising: a bonding step of bonding the transfer hologram laminate to the transfer laminate so as the volume hologram layer of the transfer hologram laminate contacts to the image-forming layer or the heat seal layer of the transfer laminate, and a substrate peeling step of peeling off the substrate of the transfer hologram laminate.

Because the image forming layer is formed at a side closer to the heat seal layer than the volume hologram layer in the volume hologram laminate produced in the present invention, it is possible to reduce generation of the irregularity caused by the image forming layer formed on the surface. Thus according to the present invention, it is possible to make the image formed on the image forming layer less easily forged and thus to produce a volume hologram laminate further superior in antiforgery function.

The present invention further provides a volume hologram transfer foil, comprising: a substrate, a volume hologram layer carrying a recorded volume hologram that is formed on the substrate, a heat seal layer containing a thermoplastic resin that is formed on the volume hologram layer, an ultraviolet ray-absorbing layer absorbing ultraviolet ray that is formed between the substrate and the volume hologram layer or between the volume hologram layer and the heat seal layer, and a fluorescent-image forming layer carrying an image formed with a fluorescent material emitting fluorescence by ultraviolet irradiation that is formed at a side closer to the heat seal layer than the ultraviolet ray-absorbing layer, characterized in that a wavelength of the ultraviolet ray absorbed by the ultraviolet ray-absorbing layer is different from a wavelength of the ultraviolet ray absorbed by the fluorescent material.

Because the volume hologram transfer foil according to the present invention has the volume hologram layer as well as the fluorescent-image forming layer, it becomes possible to transfer the volume hologram layer with the image forming layer during production of a volume hologram laminate by using the volume hologram transfer foil according to the present invention, and thus to give a volume hologram laminate further superior in antiforgery function.

Also according to the present invention, because the ultraviolet ray-absorbing layer is used, it is possible to prevent degradation by ultraviolet ray over time of at least the transfer-receiving member in the volume hologram laminate produced by using the volume hologram transfer foil according to the present invention. Further by forming the ultraviolet ray-absorbing layer between the substrate and the volume hologram layer, it is possible to prevent degradation by ultraviolet ray over time not only of the transfer-receiving member but also of the volume hologram layer in the volume hologram laminate produced by using the volume hologram transfer foil according to the present invention. Therefore with the volume hologram transfer foil according to the present invention, it is possible to produce a volume hologram transfer foil superior in durability.

In addition, according to the present invention, because the wavelength of the ultraviolet ray absorbed by the ultraviolet ray-absorbing layer is different from the wavelength of the ultraviolet ray absorbed by the fluorescent material used in the fluorescent-image forming layer, it is possible to prevent the decrease in visibility of the fluorescent image formed on the fluorescent-image forming layer caused by the ultraviolet ray-absorbing layer. Therefore with the volume hologram laminate according to the present invention, it is possible to produce a volume hologram laminate superior in design appearance.

For the reasons above, the present invention provides a volume hologram transfer foil giving a volume hologram laminate superior in antiforgery function.

In the present invention, the ultraviolet ray-absorbing layer is preferably formed between the substrate and the volume hologram layer. In this way, it is possible to prevent degradation of the volume hologram layer over time in the volume hologram laminate produced by using the volume hologram transfer foil according to the present invention, and thus to obtain a volume hologram laminate superior in durability of the volume hologram.

Also in the present invention, a peelable over protection layer is preferably formed between the substrate and the volume hologram layer. Because the presence of the peelable over protection layer allows adjustment of the adhesiveness between the substrate and the volume hologram layer, it is possible to improve the peelability of the volume hologram layer during production of a volume hologram laminate by transfer of the volume hologram layer from the volume hologram transfer foil according to the present invention. This is because, it is possible to protect the transferred volume hologram layer with the peelable over protection layer, as the peelable over protection layer is transferred with the volume hologram layer during production of a volume hologram laminate by using the volume hologram layer-transferring foil according to the present invention.

The present invention further provides a volume hologram laminate, comprising: a transfer-receiving member, a heat seal layer containing a thermoplastic resin that is formed on the transfer-receiving member, a volume hologram layer carrying a recorded volume hologram that is formed on the heat seal layer, an ultraviolet ray-absorbing layer absorbing ultraviolet ray that is formed on the volume hologram layer or between the volume hologram layer and the heat seal layer, and a fluorescent-image forming layer carrying an image formed with a fluorescent material emitting fluorescence by ultraviolet irradiation that is formed at a side closer to the heat seal layer than the ultraviolet ray-absorbing layer, characterized in that a wavelength of the ultraviolet ray absorbed by the ultraviolet ray-absorbing layer is different from a wavelength of the ultraviolet ray absorbed by the fluorescent material.

According to the present invention, with the volume hologram layer as well as the fluorescent-image forming layer formed, it is possible to produce a volume hologram laminate further superior in antiforgery function.

Also according to the present invention, it is possible to prevent degradation of the transfer-receiving member and the volume hologram layer by ultraviolet ray over time with the ultraviolet ray-absorbing layer used, and thus to obtain a volume hologram laminate superior in durability of the volume hologram.

Further according to the present invention, because the wavelength of the ultraviolet ray absorbed by the ultraviolet ray-absorbing layer is different from the wavelength of the ultraviolet ray absorbed by the fluorescent material used in the fluorescent-image forming layer, it is possible to prevent the decrease in visibility of the fluorescent image formed on the fluorescent-image forming layer caused by the ultraviolet ray-absorbing layer. Therefore, the present invention provides a volume hologram laminate superior in design appearance.

In the present invention, the ultraviolet ray-absorbing layer is preferably formed on the volume hologram layer. This is because it is possible in this way to prevent degradation of the volume hologram layer over time and thus to obtain a volume hologram laminate superior in durability of the volume hologram.

Also in the present invention, a peelable overprotection layer is preferably formed on the volume hologram layer or on the ultraviolet ray-absorbing layer. This is because it is possible in this way to protect the volume hologram layer with the peelable over protection layer.

The present invention has an advantageous effect that it can provide a volume hologram transfer foil giving a volume hologram laminate higher in antiforgery function.

DESCRIPTION OF THE PREFERRED EMBODIMENT

The present invention relates to a volume hologram transfer foil, a volume hologram laminate, and a production method thereof.

Hereinafter, the volume hologram transfer foil, the volume hologram laminate, the method of producing a volume hologram transfer foil, and the method of producing a volume hologram laminate according to the present invention will be described below in that order.

A. Volume Hologram Transfer Foil

First, the volume hologram transfer foil according to the present invention will be described. The volume hologram transfer foils according to the present invention can be divided into two groups according to the configuration, and hereinafter, the volume hologram transfer foil according to the present invention in each embodiment will be described.

A-1. Volume Hologram Transfer Foil in the First Embodiment

First, the volume hologram transfer foil in the first embodiment of the present invention will be described. The volume hologram transfer foil in the present embodiment comprises: a substrate, a volume hologram layer carrying a volume hologram that is formed on the substrate, an image forming layer carrying a formed image and a heat seal layer containing a thermoplastic resin that are formed on the volume hologram layer; and further comprises no reflective layer having a function to reflect light.

The volume hologram transfer foil in the present embodiment will be described with reference to drawings.

Figure 1:
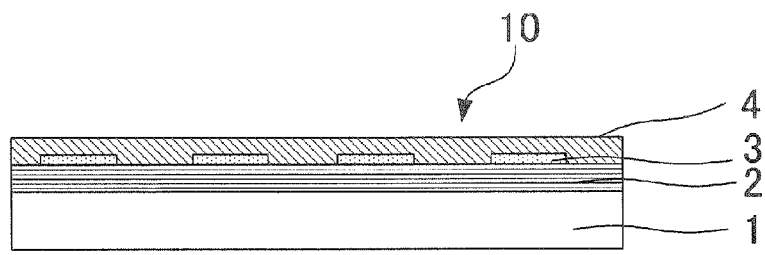
FIG. 1 is a schematic sectional view illustrating an example of the volume hologram transfer foil according to the present invention.

FIG. 1 is a schematic sectional view illustrating an example of the volume hologram transfer foil in the present embodiment. As exemplified in FIG. 1, the volume hologram transfer foil 10 in the present embodiment has a substrate 1, a volume hologram layer carrying a recorded volume hologram 2 that is formed on the substrate 1, an image forming layer 3 carrying a formed image that is formed on the volume hologram layer 2, and a heat seal layer 4 containing a thermoplastic resin formed on the image forming layer 3. The volume hologram transfer foil 10 in the present embodiment contains no reflective layer having a function to reflect light.

In producing a volume hologram laminate by using the volume hologram transfer foil in the present embodiment, which has the volume hologram layer as well as the image forming layer, it is possible to transfer the volume hologram layer together with the image forming layer and thus to give a volume hologram laminate further superior in antiforgery function.

Also in the present embodiment, wherein the image forming layer is formed closer to the heat seal layer than the volume hologram layer, it is possible to prevent formation of surface irregularity caused by the image forming layer formed on the surface of the volume hologram laminate, in producing a volume hologram laminate by using the volume hologram transfer foil in the present embodiment. For that reason, it becomes more difficult to forge the image formed on the image forming layer in the volume hologram transfer foil of the present embodiment and thus possible to give a volume hologram laminate further superior in antiforgery function.

Additionally in the present embodiment, because the volume hologram layer carrying a recorded volume hologram is used as the hologram-recorded layer, there is no need for a commonly-used reflective layer when a relief hologram is used. Accordingly in the present embodiment, the image formed on the image forming layer is not impaired in visibility, and thus, it is possible to produce a volume hologram laminate superior in design appearance. The reflective layer is normally formed, for example, by vapor deposition, which disadvantageously leads to increase in production cost, while the hologram transfer foil in the present embodiment does not demand such a reflective layer, allowing reduction of the production cost. For example when a transfer foil having a volume hologram layer is applied onto a hologram-receiving medium, it is possible to display the image visibly, even when the image is formed on the surface of the hologram layer opposite from the viewer.

Therefore in the present embodiment, it is possible to provide a volume hologram transfer foil giving a volume hologram laminate higher in antiforgery function.

Figure 2:
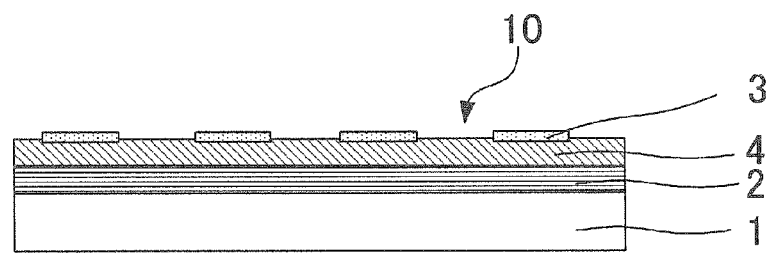
FIG. 2 is a schematic sectional view illustrating another example of the volume hologram transfer foil according to the present invention.

In FIG. 1 above, a volume hologram transfer foil having the image forming layer and the heat seal layer formed in that order on the volume hologram layer was described as an example of the volume hologram transfer foil in the present embodiment, but in the present embodiment, the order of forming the image forming layer and the heat seal layer on the volume hologram layer is not limited thereto. As exemplified in FIG. 2, the volume hologram transfer foil 10 in the present embodiment may have a structure in which the heat seal layer 4 and the image forming layer 3 are formed in that order on the volume hologram layer 2.

The volume hologram transfer foil in the present embodiment has at least a substrate, a volume hologram layer, an image forming layer and a heat seal layer, but has no reflective layer.

The reflective layers, as described in the present embodiment, include, for example, metal layers that are used in reflection-type relief holograms, but not layers containing an optically variable material such as pearl pigment.

Hereinafter, the respective components of the volume hologram transfer foil in the present embodiment will be described one by one.

1. Image Forming Layer

First, the image forming layer for use in the present embodiment will be described. The image forming layer for use in the present embodiment is a layer, wherein an image is generated, that is formed at least over the volume hologram layer described below.

The image forming layer for use in the present embodiment is not particularly limited, if a desired image is formed therein, and a layer carrying an image formed of any optional material may be used, as properly selected according to the applications of the volume hologram laminate prepared by using the volume hologram transfer foil in the present embodiment.

Any desired image may be used as the image formed on the image forming layer for use in the present embodiment, according to the applications of the volume hologram laminate prepared by using the volume hologram transfer foil in the present embodiment. The "image" in the present embodiment includes pattern, linear image, character, drawing, symbol, as well as coloring on the entire surface.

The thickness of the image forming layer for use in the present embodiment is preferably in the range of 0.1 μm to 50 μm, more preferably in the range of 0.5 μm to 20 μm. It is because an image forming layer formed on the surface of the volume hologram laminate prepared by using the volume hologram transfer foil in the present embodiment that has a thickness smaller than the range above may caused to form irregularity. On the other hand, in the case when an image forming layer is thinner than the range above, it may lead to deterioration, for example, in storage stability of the formed image.

Examples of the image forming layers for use in the present embodiment include: a fluorescent-image forming layer carrying an image formed with a fluorescent material emitting fluorescence by absorption of ultraviolet ray, and an optically-variable-image forming layer carrying an image formed by an optically variable material that changes its color according to the viewing angle. In the present embodiment, any one of these image forming layers may be used favorably, but use of the fluorescent-image forming layer and the optically-variable-image forming layer is preferable.

By using the fluorescent-image forming layer, the presence of the image forming layer cannot be easily visible from outside and thus a volume hologram laminate further superior in antiforgery function can be produced by using the volume hologram transfer foil in the present embodiment.

In addition, because the image prepared from the optically variable material cannot be copied with common ink, it is possible to produce a volume hologram laminate further superior in antiforgery function by using the optically-variable-image forming layer.

Hereinafter, the optically-variable-image forming layer and the fluorescent-image forming layer for use in the present embodiment will be described in detail.

(1) Optically-Variable-Image Forming Layer

First, the optically-variable-image forming layer for use in the present embodiment will be described. The optically-variable-image forming layer for use in the present embodiment is a layer in which an image is formed by an optically variable material. The optically variable material for use in the present embodiment is not particularly limited, if it develops a desired color, but particularly favorable is a material developing the color identical with that of the volume hologram image recorded in the volume hologram layer described below, when seen from a particular angle. It is possible by using such an optically variable material, to form an image in the image forming layer and a volume hologram image in the volume hologram layer in the same color when seen from a particular angle, and thus, it is possible to make the volume hologram invisible when seen from a particular angle and thus to improve security further, for example, by forming the volume hologram in the volume hologram layer and the image in the optically-variable-image forming layer superimposed on each other.

Examples of the optically variable materials for use in the present embodiment include pearl pigments, polarizing inks, liquid crystal inks, and retroreflective inks. These optically variable materials may be used alone or in combination or two or more in the present embodiment.

Examples of the pearl pigments include pearl essences extracted from sea foods, basic carbonate white lead, acidic lead arsenate, acidic bismuth chloride, and metal oxide-coated mica. In the present embodiment, any one of these pearl pigments may be used favorably, but in particular, metal oxide-coated micas are preferable from the viewpoint of safety. Examples of the metal oxides favorable for use from the points of glossiness and refractive index are titanium oxide and iron oxide.

The pearl pigment for use in the present embodiment may be the derivative thereof further colored for example with an additional pigment or dye.

The polarizing ink and the liquid crystal ink mean an ink of a mixture of a polarizing cholesteric polymer liquid crystal pigment, a binder, a dispersant, and others. The polarizing cholesteric polymer liquid crystal pigment is prepared by coating a mixture solution containing a crosslinkable liquid crystal polyorganosiloxane and a polymerization initiator on a supporting plate under orientation by shearing force, crosslinking the film by UV irradiation or heating, peeling off the crosslinked liquid crystal film from the supporting plate, and pulverizing the film for example in a mill.

The retroreflective ink is an ink containing reflective mirror particles such as glass beads dispersed in a binder. The ink may be used in combination with other pigment materials such as mica, aluminum powder, and coloring pearl pigment.

(2) Fluorescent-Image Forming Layer

Hereinafter, the fluorescent-image forming layer for use in the present embodiment will be described. The fluorescent-image forming layer for use in the present embodiment is a layer in which an image is formed by a fluorescent material emitting fluorescence by absorption of ultraviolet ray. The fluorescent material for use in the present embodiment is not particularly limited, if it emits fluorescence at a desired wavelength by absorption of ultraviolet ray.

In the present embodiment, the fluorescent material for use in the fluorescent-image forming layer is not particularly limited, if it can emit fluorescence at a desired wavelength range by absorption of ultraviolet ray. In particular, the wavelength of the ultraviolet ray absorbed during fluorescent emission of the fluorescent material favorably used in the present embodiment is preferably in the range of 100 nm to 400 nm, more preferably in the range of 200 nm to 400 nm.

At least one fluorescent material is used in the present embodiment, but use of multiple fluorescent materials different in emission fluorescence wavelength is preferable in the present step, and use of multiple fluorescent materials emitting fluorescence in various colors in red, green and blue is particularly preferable. This is because it is possible in this way to make the image forming layer for use in the present embodiment form a full-color fluorescent image.

Examples of the fluorescent materials for use in the present embodiment include organic and inorganic fluorescent dyes.

Examples of the organic fluorescent dyes include diaminostilbenedisulfonic acid derivatives, imidazole derivatives, coumarin derivatives, derivatives of triazole, carbazole, pyridine, naphthalic acid, and imidazolone; dyes such as fluorescein and eosin; and benzene ring-containing compounds such as anthracene. Specific examples thereof include fluorescent dyes colorless under visible light such as EB-501 (manufactured by Mitsui Chemicals, Inc., emission color: blue), EG-302 (manufactured by Mitsui Chemicals, Inc. emission color: yellowish green), EG-307 (manufactured by Mitsui Chemicals, Inc., emission color: green), ER-120 (manufactured by Mitsui Chemicals, Inc., emission color: red) and ER-122 (manufactured by Mitsui Chemicals, Inc., emission color: red); and so-called fluorescent brighteners such as UVITEX® OB (manufactured by Ciba Specialty Chemicals, emission color: blue) and europium-thenoyltrifluoroacetone chelate (Sinloihi Co., Ltd., red orange).

Examples of the inorganic fluorescent dyes include pigments containing a crystal containing the oxide, sulfide, silicate salt, phosphate salt, or tungstate salt of a metal such as Ca, Ba, Mg or Sr as the principal component that are doped with a metal or rare earth element such as Eu, Mn, Pb, Fe, Mn, Zn, Ag, or Cu. Specific examples thereof include dyes colorless or white under visible light such as G-300 series products ($SrAl_2O_4$: Eu, Dy manufactured by Nemoto & Co., Ltd. emission color: green) and V-300 series products ($CaAl_2O_4$: Eu, Nd manufactured by Nemoto & Co., Ltd. emission color: purple).

Examples of the fluorescent materials for use in the present embodiment include thiophene-based fluorescent dyes, β-quinophtharone-based fluorescent dyes, coumarin-based fluorescent dyes, bisstyrylbenzene-based fluorescent dyes, oxazole-based fluorescent dyes, and europium complex-based fluorescent dyes. Specific examples of these fluorescent dyes are exemplified for example, in Japanese Patent Application Publication No. 2004-122690.

The fluorescent-image forming layer for use in the present embodiment preferably contains normally a binder resin in addition to the fluorescent material. Examples of the binder resins for use in the present embodiment include cellulosic resins such as ethylcellulose, ethylhydroxycellulose, hydroxypropylcellulose, methylcellulose and cellulose acetate; vinyl resins such as polyvinylalcohol, polyvinyl acetate, polyvinylbutyral, polyvinylacetal and polyvinylpyrrolidone; acrylic resins such as poly (meth)acrylate and poly (meta) acrylamide; polyurethane resins, polyamide resins, polyester resins, and the mixture of these resins. In the present embodiment, any one of these any resin may be used favorably.

2. Volume Hologram Layer

Hereinafter, the volume hologram layer for use in the present embodiment will be described. The volume hologram layer for use in the present embodiment is a layer carrying a recorded volume hologram, and is transferred onto a transfer-receiving member during production of a volume hologram laminate by using the volume hologram layer-transferring foil in the present embodiment.

Hereinafter, the volume hologram layer will be described in detail.

(1) Component Materials

The component materials for the volume hologram layer for use in the present embodiment are not particularly limited, if the volume hologram is recorded thereon, and any materials commonly used for volume hologram may be used arbitrarily. Examples of the materials include known volume hologram-recording materials such as silver salt materials, dichromic acid gelatin emulsions, photopolymerizable resins, and photocrosslinkable resins. In particular, in the present embodiment, (i) a first photosensitive material containing a binder resin, a photopolymerizable compound, a photopolymerization initiator and a sensitizing dye, or (ii) a second photosensitive material containing a cationically polymerizable compound, a radically polymerizable compound, a photo-radical polymerization initiator system and a photo-cationic polymerization initiator system is used favorably.

Hereinafter, the first and second photosensitive materials will be described separately.

(i) First Photosensitive Material

First, the first photosensitive material will be described. As described above, the first photosensitive material contains a binder resin, a photopolymerizable compound, a photopolymerization initiator and a sensitizing dye.

(Binder Resin)

Examples of the binder resins include poly (meth)acrylic esters or the partial hydrolysates thereof, polyvinyl acetate or the hydrolysates thereof, copolymers containing at least one of copolymerizable monomers such as acrylic acid and acrylic esters as the polymerization component or the mixture thereof, polyisoprene, polybutadiene, polychloroprene, polyvinylacetal (partial acetylation product of polyvinylalcohol), polyvinylbutyral, polyvinyl acetate, vinyl chloride-vinyl acetate copolymers, and the mixtures thereof. During production of the volume hologram layer, a step of moving the monomer by heating may be sometimes carried out for stabilization of the recorded volume hologram. For that reason, the binder resin for use in the present embodiment is preferably a resin having a low glass transition temperature, allowing easy monomer movement.

(Photopolymerizable Compound)

The photopolymerizable compound for use may be a photo-polymerizable photocrosslinkable monomer having at least one ethylenically unsaturated bond, as will be described below, or an oligomer, a prepolymer or the mixture thereof. Specific examples thereof include unsaturated carboxylic acids and the salts thereof, esters from an unsaturated carboxylic acid and an aliphatic polyvalent alcohol compound, and amide compounds from an unsaturated carboxylic acid and an aliphatic polyvalent amine compound.

Specific examples of the unsaturated carboxylic acid monomers include acrylic acid, methacrylic acid, itaconic acid, crotonic acid, isocrotonic acid, and maleic acid. Examples of the monomers of esters from an aliphatic polyvalent alcohol compound and an unsaturated carboxylic acid include: acrylic esters such as ethylene glycol diacrylate, triethylene glycol diacrylate, 1,3-butanediol diacrylate, tetramethylene glycol diacrylate, propylene glycol diacrylate, neopentylglycol diacrylate, trimethylolpropane triacrylate, trimethylolpropane tri (acryloyloxypropyl)ether and trimethylolethane triacrylate.

Examples of the methacrylic esters include tetramethylene glycol dimethacrylate, triethylene glycol dimethacrylate, neopentylglycol dimethacrylate, trimethylolpropane trimethacrylate, and trimethylolethane trimethacrylate. Examples of the itaconic esters include ethylene glycol diitaconate, propylene glycol diitaconate, and 1,3-butanediol diitaconate. Examples of the crotonic esters include ethylene glycol dicrotonate, tetramethylene glycol dicrotonate, pentaerythritol dicrotonate, and sorbitol tetracrotonate. Examples of the isocrotonic esters include ethylene glycol diisocrotonate, pentaerythritol diisocrotonate, and sorbitol tetraisocrotonate. Further, examples of the maleic esters include ethylene glycol dimaleate, triethylene glycol dimaleate, pentaerythritol dimaleate, and sorbitol tetramaleate.

Examples of the halogenated unsaturated carboxylic acids include 2,2,3,3-tetrafluoropropyl acrylate, 1H,1H,2H,2H-heptadecafluorodecyl acrylate, and 2,2,3,3-tetrafluoropropyl methacrylate.

Specific examples of the monomers of amides from an unsaturated carboxylic acid and an aliphatic polyvalent amine compound include methylene bisacrylamide, methylene bismethacrylamide, and 1,6-hexamethylene bisacrylamide, 1,6-hexamethylene bismethacrylamide.

(Photopolymerization Initiator)

Examples of the photopolymerization initiators for use in the present embodiment include 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isooxazolone, 2-mercaptobenzimidazole, and imidazole dimers. In particular, the photopolymerization initiator for use in the present embodiment is preferably subjected to decomposition treatment after hologram recording, for stabilization of the recorded volume hologram. For example, organic peroxide-based initiators, which are easily decomposed by UV irradiation, are preferable.

(Sensitizing Dye)

Examples of the sensitizing dyes for use in the present embodiment include thiopyrylium salt-based dyes, merocyanine-based dyes, quinoline-based dyes, styrylquinoline-based dyes, ketocoumarin-based dyes, thioxanthene-based dyes, xanthene-based dyes, oxonol-based dyes, cyanine dyes, rhodamine dyes, thiopyrylium salt-based dyes, pyrylium ion-based dyes, and diphenyliodonium ion-based dyes.

(ii) Second Photosensitive Material

Hereinafter, the second photosensitive material for use in the present embodiment will be described. As described above, the second photosensitive material contains a cationically polymerizable compound, a radically polymerizable compound, a photo-radical polymerization initiator system, and a cationic polymerization initiator system.

When the second photosensitive material is used, a volume hologram is recorded in the volume hologram layer, for example, by a method of activating photo-radical polymerization initiator system by irradiating the photosensitive material with a laser beam and then activating the photo-cationic polymerization initiator system by irradiation of another laser beam different in wavelength.

(Cationically Polymerizable Compound)

Because the polymerization of the radically polymerizable compound is desirably performed in a relatively low-viscosity composition, the cationically polymerizable compound is favorably liquid at room temperature. Examples the cationically polymerizable compounds include diglycerol diether, pentaerythritol polydiglycidyl ether, 1,4-bis(2,3-epoxypropoxyperfluoroisopropyl)cyclohexane, sorbitol polyglycidyl ether, 1,6-hexanediol glycidyl ether, polyethyleneglycol diglycidyl ether, and phenyl glycidyl ether.

(Radically Polymerizable Compound)

The radically polymerizable compound is preferably a compound having at least one ethylenically unsaturated double bond in the molecule. The average refractive index of the radically polymerizable compound for use in the present embodiment is preferably larger, preferably by 0.02 or more, than that of the cationically polymerizable compound. It is because the volume hologram is formed by the difference in refractive index between the radically polymerizable compound and the cationically polymerizable compound. Accordingly, a difference in average refractive index not larger than the value above leads to insufficient refractive index modulation. Examples of the radically polymerizable compounds for use in the present embodiment include acrylamide, methacrylamide, styrene, 2-bromostyrene, phenyl acrylate, 2-phenoxyethyl acrylate, 2,3-naphthalenedicarboxylic acid (acryloxyethyl)monoester, methylphenoxyethyl acrylate, nonylphenoxyethyl acrylate, and β-acryloxyethyl hydrogen phthalate.

(Photo-Radical Polymerization Initiator System)

The photo-radical polymerization initiator system for use in the present embodiment is not particularly limited, if it generates by the first light exposure an active radical, which can polymerize the radically polymerizable compound, during recording of volume hologram. In addition, a sensitizer, generally a component absorbing light, and an acid-generating compound or a radical-generating compound may be used in combination. The sensitizer for use in such a photo-radical polymerization initiator system is often a colored compound such as dye for absorption of visible laser, but use of a cyanine-based dye is preferable for production of a colorless transparent hologram. It is because the cyanine-based dyes generally decompose easily by light and thus, the dye in the hologram decomposes and loses its absorption in the visible region during post-exposure in the present embodiment or when left under indoor light or sunlight for a period of several hours to several days, giving a transparent and colorless volume hologram.

Specific examples of the cyanine-based dyes include anhydro-3,3'-dicarboxymethyl-9-ethyl-2,2'-thiacarbocyanine betaine, anhydro-3-carboxymethyl-3',9'-diethyl-2,2'-thiacarbocyanine betaine, 3,3',9-triethyl-2,2'-thiacarbocyanine iodide salt, 3,9-diethyl-3'-carboxymethyl-2,2'-thiacarbocyanine iodide salt, 3,3',9-triethyl-2,2'-(4,5,4',5'-dibenzo)thiacarbocyanine iodide salt, 2-[3-(3-ethyl-2-benzothiazolidene)-1-propenyl]-6-[2-(3-ethyl-2-benzothiazolidene)ethylidenimino]-3-ethyl-1,3,5-thiadiazolium iodide salt, 2-[[3-allyl-4-oxo-5-(3-n-propyl-5,6-dimethyl-2-benzothiazolylidene)-ethylidene-2-thiazolinylidene]methyl]3-ethyl-4,5-diphenyl thiazolinium iodide salt, 1,1',3,3,3',3'-hexamethyl-2,2'-indotricarbocyanine iodide salt, 3,3'-diethyl-2,2'-thiatricarbocyanine perchlorate salt, anhydro-1-ethyl-4-methoxy-3'-carboxymethyl-5'-chloro-2,2'-quinothiacyanine betaine, and anhydro-5,5'-diphenyl-9-ethyl-3,3'-disulfopropyloxacarbocyanine hydroxide triethylamine salt. These compounds may be used alone or in combination of two or more.

Examples of the active radical-generating compounds include diaryliodonium salts and 2,4,6-substituted-1,3,5-triazines. If high photosensitivity is desired, use of a diaryliodonium salt is particularly preferable. Specific examples of the diaryliodonium salts include chloride, bromide, tetrafluoroborate, hexafluorophosphate, hexafluoroarsenate, hexafluoroantimonate, and trifluoromethanesulfonate salts of 4,4'-dichlorodiphenyliodonium, 4,4'-dimethoxydiphenyliodonium, 4,4'-ditertiary-butyl diphenyliodonium, and 3,3'-dinitrodiphenyliodonium; 9,10-dimethoxyanthracene-2-sulfonate salt of diphenyliodonium, and the like. Specific examples of 2,4,6-substituted-1,3,5-triazines include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2,4-bis(trichloromethyl)-6-(p-methoxyphenylvinyl)-1,3,5-triazine, and 2-(4'-methoxy-1'-naphthyl)-4,6-bis(trichloromethyl)-1,3,5-triazine.

(Photo-Cationic Polymerization Initiator System)

The photo-cationic polymerization initiator system for use in the present embodiment is not particularly limited, if it is an initiator system that is less photosensitive in the first exposure in recording a volume hologram but is sensitive enough in the post exposure when a light different in wavelength from that in the first exposure is irradiated, generating a Bronsted acid or a Lewis acid and polymerizing a cationically polymerizable compound. In particular, in the present embodiment, use of an initiator system not causing polymerization of the cationically polymerizable compound is particularly preferable during the first exposure. Examples of the photo-cationic polymerization initiator systems include diaryliodonium salts, triarylsulfonium salts, and iron allene complexes. Preferable among the diaryliodonium salts are those that are shown for the photo-radical polymerization initiator systems described above including tetrafluoroborate, hexafluorophosphate, hexafluoroarsenate and hexafluoroantimonate salts of iodonium compounds and the like. Favorable among triarylsulfonium salts are triphenylsulfonium, 4-tertiary-butyltriphenylsulfonium and the like.

(Method of Determining Refractive Index)

The refractive index of the resin obtained by adding a photo-cationic polymerization initiator to the cationically polymerizable compound can be determined in the following manner. Specifically, a resin obtained by adding a photo-cationic polymerization initiator to the cationically polymerizable compound is applied on a surface release-finished PET film (e.g., trade name "SP-PET" 50 µm, manufactured by Tohcello co., Ltd.) by using an applicator to a thickness of approximately 20 µm, and the resulting film is dried under heat and cured by UV irradiation. The surface release-finished PET film is then removed by peeling from the layer of cationically polymerizable compound+photo-cationic polymerization initiator/surface release-finished PET film, giving a single layer of cationically polymerizable compound+photo-cationic polymerization initiator. The refractive index of the single layer of cationically polymerizable compound+photo-cationic polymerization initiator thus prepared is then determined at a measurement wavelength of 589 nm by using a refractive index analyzer (multi-wavelength Abbe's refractometer DR-M4, manufactured by Atago Co., Ltd.) and using monobromonaphthalene as the refractive index-compensating solution.

The refractive index of the resin prepared by adding a photo-radical polymerization initiator to the radically polymerizable compound can also be determined by a method similar to that above.

(Others)

The second photosensitive material may contain additionally as needed a binder resin, a thermal polymerization inhibitor, a silane-coupling agent, a plasticizer, a colorant, or the like. The binder resin is used for improvement in film-forming property of the composition before hologram formation and also in uniformity in film thickness, and also for preservation of the interference fringe formed by polymerization caused by irradiation of light such as laser beam until the post exposure. The binder resin may be any resin, if it is compatible with the cationically polymerizable compound and the radically polymerizable compound, and examples thereof include chlorinated polyethylene, polymethyl methacrylate, copolymers of methyl methacrylate and other alkyl (meth)acrylate esters, copolymers of vinyl chloride and acrylonitrile, polyvinyl acetate and the like. The binder resin may have reactive groups such as cationically polymerizable groups on the branched chains or in the main chains.

(2) Thickness

The thickness of the volume hologram layer for use in the present embodiment is not particularly limited, if it is in the range allowing production of a particular volume hologram, and may be altered or adjusted properly according to the kinds of the constituent materials described above. In particular, the thickness of the volume hologram layer for use in the present embodiment is preferably in the range of 1 µm to 50 µm, particularly preferably in the range of 3 µm to 25 µm.

3. Heat Seal Layer

Hereinafter, the heat seal layer for use in the present embodiment will be described. The heat seal layer for use in the present embodiment contains a thermoplastic resin and has a function to bind the volume hologram layer to the transfer-receiving member during production of a volume hologram laminate by using the volume hologram transfer foil in the present embodiment.

Hereinafter, the heat seal layer for use in the present embodiment will be described in detail.

The thermoplastic resin for use in the present embodiment is not particularly limited, if it can bond the volume hologram layer and the transfer-receiving member to each other according to the kind of the transfer-receiving member to which the volume hologram layer is transferred from the volume hologram transfer foil in the present embodiment. Examples of the thermoplastic resins include maleic acid modified vinyl chloride-vinyl acetate resin copolymers, ethylene-vinyl acetate resin copolymers, vinyl chloride-vinyl acetate resin copolymers, polyamide resins, polyester resins, polyethylene resins, ethylene-isobutyl acrylate copolymer resins, butyral resins, polyvinyl acetate and the copolymer resins thereof, ionomer resins, acid-modified polyolefin resins, (meth)acrylic resins such as acrylic and methacrylic resins, acrylic ester resins, ethylene-(meth)acrylate copolymers, ethylene-(meth)acrylic ester copolymers, polymethyl methacrylate resins, cellulosic resins, polyvinylether resins, polyurethane resins, polycarbonate resins, polypropylene resins, epoxy resins, phenol resins, vinyl resins, maleic resins, alkyd resins, polyethyleneoxide resins, urea resins, melamine resins, melamine-alkyd resins, silicone resins, rubber resins, styrene butadiene styrene block copolymers (SBS), styrene isoprene styrene block copolymers (SIS), styrene ethylene butylene styrene block copolymers (SEBS), and styrene ethylene propylene styrene block copolymers (SEPS). In the present embodiment, any one of these thermoplastic resins is used favorably.

The thermoplastic resins for use in the present embodiment may be used alone or in combination of two or more.

The heat seal layer for use in the present embodiment may contain other additives, together with the thermoplastic resin. Examples of the additives for use in the present embodiment include dispersant, filler, plasticizer, and antistatic agent.

The thickness of the heat seal layer for use in the present embodiment is not particularly limited and is selected properly according to the kind of the volume hologram layer foil and to the kind of the transfer-receiving member to which the volume hologram layer is transferred by using the volume hologram transfer foil in the present embodiment, but normally, preferably in the range of 0.3 µm to 50 µm, more preferably in the range of 0.5 µm to 25 µm. It is because a thickness smaller than the range above may lead to insufficient adhesion with the transfer-receiving member. Alternatively, if the thickness is larger than the range above, the temperature needed to heat the heat seal layer during transfer of the volume hologram layer from the volume hologram transfer foil in the present embodiment becomes higher, causing a concern about the damage on the substrate and others.

4. Substrate

Hereinafter, the substrate for use in the present embodiment will be described. The substrate for use in the present embodiment has function to support the image forming layer, the volume hologram layer and the heat seal layer described above.

The substrate for use in the present embodiment is not particularly limited, if it supports the volume hologram layer and the heat seal layer. Specific examples of the substrates include resin films including polyethylene film, polypropylene film, polyethylene fluoride-based film, polyvinylidene fluoride film, polyvinyl chloride film, polyvinylidene chloride film, ethylene-vinylalcohol copolymer film, polyvinylalcohol film, polymethyl methacrylate film, polyether sulfone film, polyether ether ketone film, polyamide film, tetrafluoroethylene-perfluoroalkyl vinylether copolymer film, polyester films such as polyethylene terephthalate film, and polyimide film, and the like.

The thickness of the substrate for use in the present embodiment is determined properly, for example, according to the application and the kind of the volume hologram laminate produced in the present embodiment, but normally in the range of 2 µm to 200 µm, preferably in the range of 10 µm to 50 µm.

5. Other Components

The volume hologram transfer foil in the present embodiment has at least the substrate, the image forming layer, the volume hologram layer, the heat seal layer, and no reflective layer, but may contain any other components as needed in the present embodiment. The other component for use in the present embodiment is not particularly limited, and is used as selected properly according to factors such as the application of the volume hologram laminate produced by using the volume hologram transfer foil in the present embodiment. In particular, the other component used favorably in the present embodiment is, for example, a peelable over protection layer formed between the substrate and the volume hologram layer.

Figure 3:
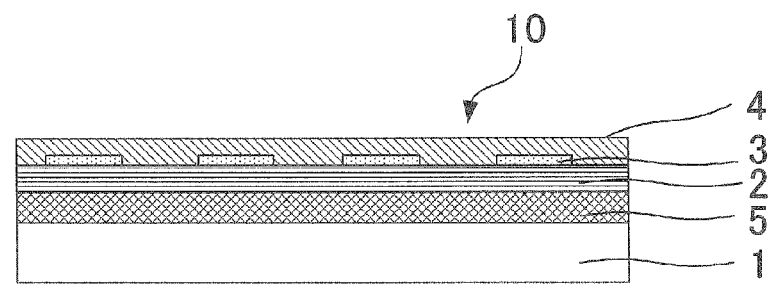
FIG. 3 is a schematic sectional view illustrating another example of the volume hologram transfer foil according to the present invention.

Hereinafter, the case when a peelable over protection layer is used in the volume hologram transfer foil in the present embodiment will be described with reference to drawings. FIG. 3 is a schematic sectional view illustrating an example of the case when a peelable overprotection layer is used in the volume hologram transfer foil in the present embodiment. As exemplified in FIG. 3, the volume hologram transfer foil 10 in the present embodiment many have a peelable over protection layer 5 formed between the substrate 1 and the volume hologram layer 2.

The additional peelable over protection layer formed on the volume hologram transfer foil in the present embodiment gives the following two advantageous effects.

First, use of the peelable over protection layer, which enables adjustment of the adhesive strength between the substrate and the volume hologram layer in any range, allows improvement in peelability of the volume hologram layer from the substrate during transfer of the volume hologram layer from the volume hologram transfer foil in the present embodiment.

Secondly, use of the peelable over protection layer, which permits coverage of the volume hologram layer surface with the peelable over protection layer during transfer of the volume hologram layer onto a transfer-receiving member by using the volume hologram transfer foil in the present embodiment, enables protection of the transferred volume hologram layer with the peelable over protection layer.

Examples of the materials for the peelable over protection layer for use in the present embodiment include acrylic and methacrylic acid resins such as polymethyl acrylate and polymethyl methacrylate, polyvinyl chloride resins, cellulosic resins, silicone resins, chlorinated rubbers, casein, various surfactants, metal oxides, the mixtures of two or more of them, and the like.

Examples of the other components for use in the present embodiment other than the peelable over protection layer include a component having an additional primer layer used for improvement in adhesiveness between the volume hologram layer and the heat seal layer or between the volume hologram layer and the peelable over protection layer. Examples of the primer layers include polyurethane, polyester, polyvinyl chloride resins, polyvinyl acetate resins, vinyl chloride-vinyl acetate copolymers, acrylic resins, polyvinylalcohol resins, polyvinylacetal resins, copolymers of ethylene with vinyl acetate, or acrylic acid, epoxy resins, and the like.

A barrier layer may be formed between the volume hologram layer and the heat seal layer also as the other component of the present embodiment. Depending on the combination of the photosensitive material used for the volume hologram layer and the thermoplastic resin used for the heat seal layer, low-molecular weight components often move from the volume hologram layer to the other layer over time, leading to blue shift (shift toward shorter wavelength) of the light for regenerating the volume hologram recorded in the volume hologram layer, but presence of the barrier layer eliminates such a problem.

The material for the barrier layer is not particularly limited, if it is a material having desired barrier properties, but normally is a transparent organic resin material. Examples of the transparent organic resin materials for use in the present embodiment include solvent-free trifunctional or higher, preferably hexafunctional or higher, ionizing radiation-hardening epoxy-modified acrylate resins, urethane-modified acrylate resins and acryl-modified polyester resins that react by ionizing radiation ray such as ultraviolet ray or electron beam, and the like.

6. Method of Producing a Volume Hologram Transfer Foil

The volume hologram transfer foil in the present embodiment can be produced by laminating a volume hologram layer, a heat seal layer and an image forming layer sequentially on a lengthy (web) substrate. The method of forming the image forming layer is selected properly according to the materials used for the image forming layer, and it is, for example, a printing method or a transfer method. The method described below in "C. Method of producing a volume hologram transfer foil" is used favorably as the method of producing a volume hologram transfer foil in the present embodiment.

A-2. Volume Hologram Transfer Foil in the Second Embodiment

Hereinafter, the volume hologram transfer foil in the second embodiment of the present invention will be described. The volume hologram transfer foil in the present embodiment has: a substrate, a volume hologram layer carrying a recorded volume hologram that is formed on the substrate, a heat seal layer containing a thermoplastic resin that is formed on the volume hologram layer, an ultraviolet ray-absorbing layer absorbing ultraviolet ray formed between the substrate and the volume hologram layer or between the volume hologram layer and the heat seal layer, a fluorescent-image forming layer carrying an image formed with a fluorescent material emitting fluorescence by ultraviolet irradiation that is formed at a side closer to the heat seal layer than the ultraviolet ray-absorbing layer, characterized in that a wavelength of the ultraviolet ray absorbed by the ultraviolet ray-absorbing layer is different from a wavelength of the ultraviolet ray absorbed by the fluorescent material.

Figure 4:
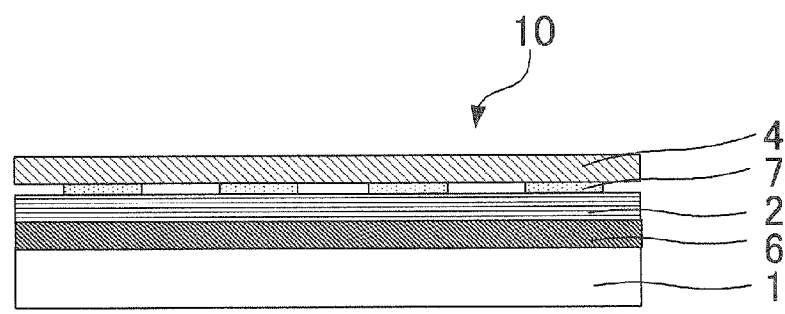
FIG. 4 is a schematic sectional view illustrating an example of the volume hologram transfer foil according to the present invention.

Such a volume hologram transfer foil in the present embodiment will be described below with reference to drawings. FIG. 4 is a schematic sectional view illustrating an example of the volume hologram transfer foil in the present embodiment. As exemplified in FIG. 4, the volume hologram transfer foil 10 in the present embodiment has a substrate 1, a volume hologram layer carrying a recorded volume hologram 2 formed on the substrate 1, a heat seal layer 4 containing a thermoplastic resin that is formed on the volume hologram layer 2, an ultraviolet ray-absorbing layer 6 absorbing ultraviolet ray formed between the substrate 1 and the volume hologram layer 2, and a fluorescent-image forming layer 7 carrying an image formed with a fluorescent material emitting fluorescence by ultraviolet irradiation that is formed at as side closer to the heat seal layer 4 than the ultraviolet ray-absorbing layer 6, i.e., between the volume hologram layer 2 and the heat seal layer 4.

In such an example, the volume hologram transfer foil 10 in the present embodiment is characterized in that the wavelength of the ultraviolet ray absorbed by the ultraviolet ray-absorbing layer 6 is different from that of the ultraviolet ray absorbed by the fluorescent material contained in the fluorescent-image forming layer 7.

In the present embodiment, use of the fluorescent-image forming layer in addition to the volume hologram layer enables co-transfer of the volume hologram layer and the fluorescent-image forming layer during production of a volume hologram laminate by using the volume hologram transfer foil in the present embodiment, thus giving a volume hologram laminate superior in antiforgery function.

Also in the present embodiment, the ultraviolet ray-absorbing layer formed prevents deterioration over time by ultraviolet ray of at least the transfer-receiving member in the volume hologram laminate prepared by using the volume hologram transfer foil in the present embodiment. In addition, the ultraviolet ray-absorbing layer formed between the substrate and the volume hologram layer prevents degradation by ultraviolet ray over time of the transfer-receiving member as well as the volume hologram layer in the volume hologram laminate prepared by using the volume hologram transfer foil in the present embodiment. Thus, it is possible to produce a volume hologram transfer foil superior in durability by using the volume hologram transfer foil in the present embodiment.

Further in the present embodiment, because the wavelength of the ultraviolet ray absorbed by the ultraviolet ray-absorbing layer is different from that of the ultraviolet ray absorbed by the fluorescent material used in the fluorescent-image forming layer, it is possible to prevent non-identification of the fluorescent image formed on the fluorescent-image forming layer by the ultraviolet ray-absorbing layer. Accordingly, the volume hologram laminate in the present embodiment gives a volume hologram laminate superior in design appearance.

Therefore, the present embodiment provides a volume hologram transfer foil allowing production of a volume hologram laminate superior in antiforgery function.

The volume hologram transfer foil in the present embodiment has at least a substrate, a volume hologram layer, a heat seal layer, an ultraviolet ray-absorbing layer, and a fluorescent-image forming layer, and may have other components as needed.

Hereinafter, each component in the volume hologram transfer foil for use in the present embodiment will be described one by one. The volume hologram layer, the heat seal layer, the fluorescent-image forming layer and the substrate for use in the present embodiment are the same as those described in the section "A-1. Volume hologram transfer foil in the first embodiment", and thus, description thereof is omitted here.

1. Ultraviolet Ray-Absorbing Layer

The ultraviolet ray-absorbing layer for use in the present embodiment will be described. The ultraviolet ray-absorbing layer for use in the present embodiment is formed between the substrate and the volume hologram layer or between the volume hologram layer and the heat seal layer, and absorbs an ultraviolet ray at a wavelength different from the ultraviolet ray absorbed by the fluorescent material used in the fluorescent-image forming layer.

The ultraviolet ray-absorbing layer for use in the present embodiment may be formed, between the substrate and the volume hologram layer or between the volume hologram layer and the heat seal layer, but is particularly preferably formed between the substrate and the volume hologram layer. The ultraviolet ray-absorbing layer for use in the present embodiment has a function to prevent degradation by ultraviolet ray over time of the volume hologram layer or the transfer-receiving member in the volume hologram laminate prepared by using the volume hologram transfer foil in the present embodiment; when the ultraviolet ray-absorbing layer is formed between the substrate and the volume hologram layer, ultraviolet ray-absorbing layer is formed on the volume hologram layer in the volume hologram laminate prepared by using the volume hologram transfer foil in the present embodiment, and thus, it is possible to prevent degradation both of the volume hologram layer and the transfer-receiving member by ultraviolet ray over time.

The wavelength of the ultraviolet ray absorbed by the ultraviolet ray-absorbing layer for use in the present embodiment is not particularly limited, if it is different from that of the ultraviolet ray absorbed by the fluorescent material for use in the fluorescent-image forming layer. The ultraviolet ray-absorbing layer has a function to prevent degradation by ultraviolet ray over time of the transfer-receiving member or the volume hologram layer in the volume hologram laminate prepared by using the volume hologram transfer foil in the present embodiment. From the viewpoint above, the wavelength of the ultraviolet ray-absorbing layer is preferably in the range of 100 nm to 400 nm.

The material for the ultraviolet ray-absorbing layer for use in the present embodiment is not particularly limited, if it is an ultraviolet ray-absorbing material absorbing an ultraviolet ray at a wavelength different from that of the ultraviolet ray absorbed by the fluorescent material according to the kind of the fluorescent material contained in the fluorescent-image forming layer. Examples of the ultraviolet ray-absorbing materials include organic ultraviolet absorbents, reactive ultraviolet absorbents, and inorganic ultraviolet absorbents.

Examples of the organic ultraviolet absorbents include salicylate-based, benzophenone-based, benzotriazole-based, substituted acrylonitrile-based, nickel chelate-based, hindered amine-based, phenyltriazine-based, anilide oxalate-based, ester malonate-based and other ultraviolet absorbents.

The reactive ultraviolet absorbent is used in combination when the organic ultraviolet absorbent is immobilized onto a resin binder by reaction, for example, of the functional group such as addition-polymerization double bond such as vinyl, acryloyl or methacryloyl, alcoholic hydroxyl groups, amino groups, carboxyl groups, epoxy groups, isocyanate groups or the like introduced to the organic ultraviolet absorbent. The reactive immobilization is performed, for example, by a method of copolymerizing a known monomer, an oligomer, or a resin component of reactive polymer with a reactive ultraviolet absorbent having such an addition-polymerization double bond by radical polymerization. If the reactive ultraviolet absorbent has a hydroxyl, amino, carboxyl, epoxy, or isocyanate group, it is possible to immobilize the reactive ultraviolet absorbent on the thermoplastic resin by reaction between the reactive group and the reactive thermoplastic resin, for example, under heat and as needed in the presence of a catalyst.

Examples of the inorganic ultraviolet absorbents include fine particles of zinc oxide, titanium oxide, cerium oxide, and iron oxide, and they may be used as dispersed in a binder as needed.

2. Other Components

The volume hologram transfer foil in the present embodiment has at least the substrate, the volume hologram layer, the heat seal layer, the fluorescent-image forming layer and the ultraviolet ray-absorbing layer, but may have other components as needed. The other component for use in the present embodiment is not particularly limited and selected properly, for example, according to the application of the volume hologram laminate produced by using the volume hologram transfer foil in the present embodiment. The other component used particularly favorably in the present embodiment is a peelable over protection layer formed between the substrate and the volume hologram layer.

Figure 5:
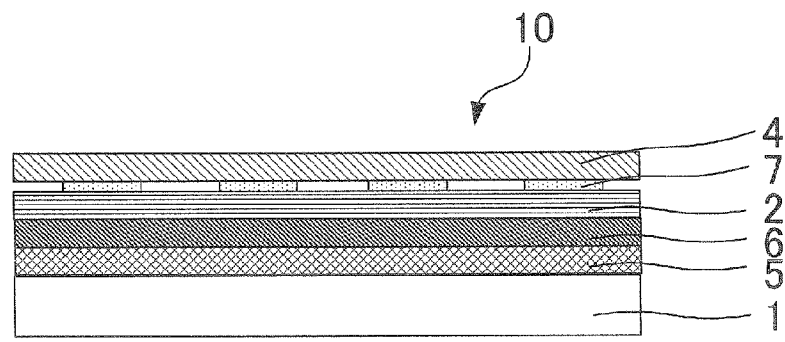
FIG. 5 is a schematic sectional view illustrating another example of the volume hologram transfer foil according to the present invention.

The case of a peelable over protection layer being used in the volume hologram transfer foil in the present embodiment will be described with reference to drawings. FIG. 5 is a schematic sectional view illustrating an example of the case when a peelable over protection layer is formed on the volume hologram transfer foil in the present embodiment. As exemplified in FIG. 5, the volume hologram transfer foil 10 in the present embodiment may have a peelable over protection layer 5 formed between the substrate 1 and the volume hologram layer 2.

The peelable over protection layer for use in the present embodiment is the same as that described in the section "A-1. Volume hologram transfer foil in the first embodiment", and thus, description thereof is omitted.

3. Volume Hologram Transfer Foil

The volume hologram transfer foil in the present embodiment has the substrate, the volume hologram layer, the heat seal layer, the ultraviolet ray-absorbing layer and the fluorescent-image forming layer, but the configuration thereof, i.e., the order of layers, is not particularly limited, if the ultraviolet ray-absorbing layer is formed between the substrate and the volume hologram layer or between the volume hologram layer and the heat seal layer, and the fluorescent-image forming layer is placed at a side closer to the heat seal layer than the ultraviolet ray-absorbing layer. One of the configurations of the volume hologram transfer foil in the present embodiment is selected properly according to the application of the volume hologram laminate prepared by using the volume hologram transfer foil in the present embodiment.

The configurations of the volume hologram transfer foil in the present embodiment are divided grossly into two groups: a configuration where the ultraviolet ray-absorbing layer is formed between the substrate and the volume hologram layer, and a configuration where the ultraviolet ray-absorbing layer is formed between the volume hologram layer and the heat seal layer.

Figure 6A:
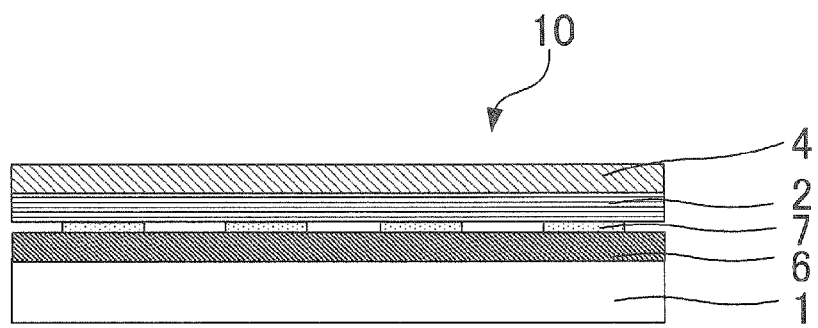
FIGS. 6A to 6C are each a schematic sectional view illustrating another example of the volume hologram transfer foil according to the present invention.
Figure 6B:
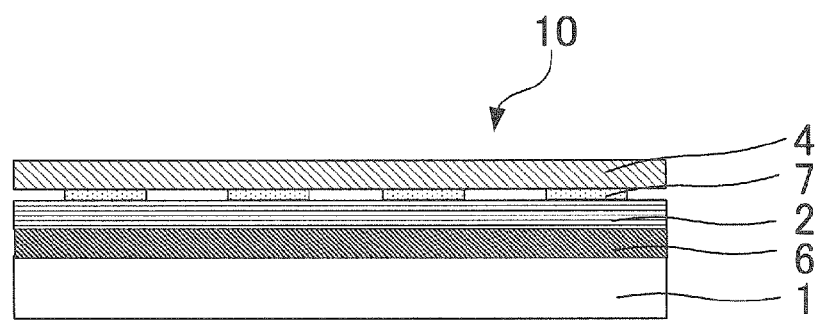
Figure 6C:
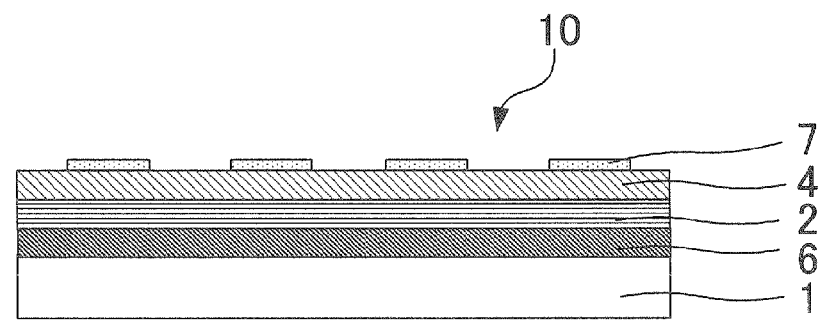

The configurations of the volume hologram transfer foil in the present embodiment will be described specifically with reference to drawings. FIGS. 6A to 6C are a schematic sectional view illustrating an example of the case when the ultraviolet ray-absorbing layer is formed between the substrate and the volume hologram layer in the volume hologram transfer foil in the present embodiment.

As exemplified in FIGS. 6A to 6C, in the volume hologram transfer foil 10 in the present embodiment, the ultraviolet ray-absorbing layer 6 may be formed between the substrate 1 and the volume hologram layer 2. Alternatively, the volume hologram transfer foils in such a configuration can divided into three groups, depending on the position where the fluorescent-image forming layer 7 is formed. Specifically when the ultraviolet ray-absorbing layer 6 is formed between the substrate 1 and the volume hologram layer 2, the fluorescent-image forming layer 7 may be formed: between the ultraviolet ray-absorbing layer 6 and the volume hologram layer 2, as exemplified in FIG. 6A; between the volume hologram layer 2 and the heat seal layer 4 as exemplified in FIG. 6B; or on the heat seal layer 4 as exemplified in FIG. 6C.

When the ultraviolet ray-absorbing layer is formed between the substrate and the volume hologram layer, the peelable over protection layer is formed between the substrate and the ultraviolet ray-absorbing layer.

Figure 7A:
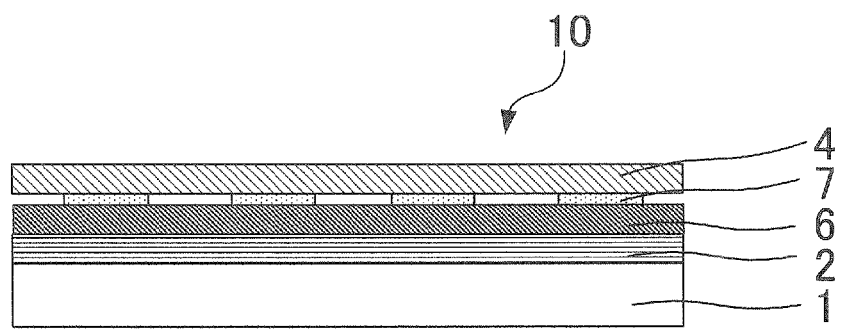
FIGS. 7A and 7B are each a schematic sectional view illustrating another example of the volume hologram transfer foil according to the present invention.
Figure 7B:
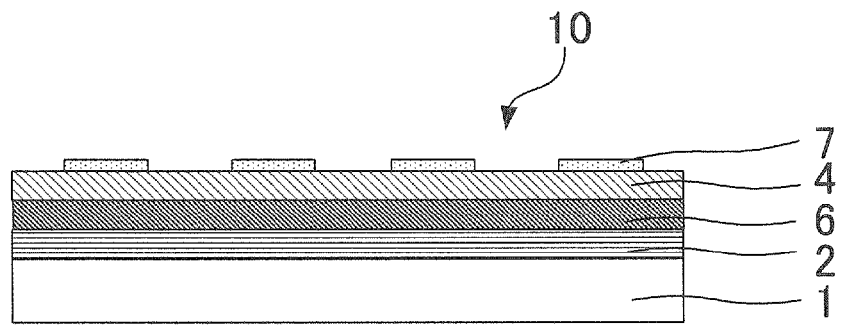

On the other hand, FIGS. 7A and 7B are each a schematic sectional view illustrating an example of the case when the ultraviolet ray-absorbing layer is formed between the volume hologram layer and the heat seal layer in the volume hologram transfer foil in the present embodiment.

As exemplified in FIGS. 7A and 7B, in the volume hologram transfer foil 10 in the present embodiment, the ultraviolet ray-absorbing layer 6 may be formed between the volume hologram layer 2 and the heat seal layer 4. The volume hologram transfer foils in such a configuration can be grouped into two groups, depending on the position of the fluorescent-image forming layer 7 formed. Specifically, when the ultraviolet ray-absorbing layer 6 is formed between the volume hologram layer 2 and the heat seal layer 4, the fluorescent-image forming layer 7 may be formed: between the ultraviolet ray-absorbing layer 6 and the heat seal layer 4 as exemplified in FIG. 7A; or on the heat seal layer 4 as exemplified in FIG. 7B.

4. Method of Producing a Volume Hologram Transfer Foil

The volume hologram transfer foil in the present embodiment may be formed by a method of laminating the volume hologram layer and the heat seal layer sequentially on a substrate. The method is the same as generally known methods for producing a volume hologram transfer foil, and thus, description thereof in detail is omitted.

B. Volume Hologram Laminate

Hereinafter, the volume hologram laminate according to the present invention will be described. The volume hologram laminates according to the present invention are divided grossly into two groups. The volume hologram laminates according to the present invention in respective groups will be described below.

B-1. Volume Hologram Laminate in the First Embodiment

First, the volume hologram laminate in the first embodiment of the present invention will be described. The volume hologram laminate in the present embodiment comprising: a transfer-receiving member, an image forming layer carrying a formed image and a heat seal layer containing a thermoplastic resin formed on the transfer-receiving member, and a volume hologram layer carrying a recorded volume hologram formed on the image forming layer and the heat seal layer.

Figure 8:
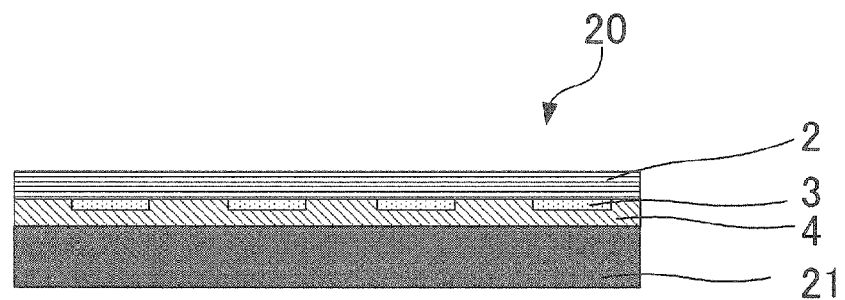
FIG. 8 is a schematic sectional view illustrating an example of the volume hologram laminate according to the present invention.

The volume hologram laminate in the present embodiment in such a configuration will be described with reference to drawings. FIG. 8 is a schematic sectional view illustrating an example of the volume hologram laminate in the present embodiment. As exemplified in FIG. 8, the volume hologram laminate 20 in the present embodiment has a transfer-receiving member 21, a heat seal layer 4 containing a thermoplastic resin formed on the transfer-receiving member 21, an image forming layer 3 carrying a formed image formed on the heat seal layer 4, and a volume hologram layer 2 carrying a recorded volume hologram formed on the image forming layer 3.

In the present embodiment, wherein the volume hologram layer and the image forming layer are used, it is possible to obtain a volume hologram laminate superior in antiforgery function.

Also in the present embodiment, wherein the image forming layer is formed at a side closer to the heat seal layer than the volume hologram layer, it is possible to reduce the irregularity formed on the surface of the volume hologram laminate according to the present embodiment caused by the image forming layer formed. Therefore in the present embodiment, it is possible to make the image formed on the image forming layer less easily forged and thus, to produce a volume hologram laminate further superior in antiforgery function.

Figure 9:
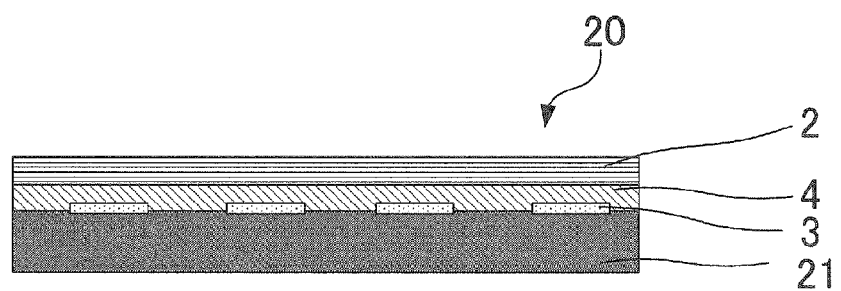
FIG. 9 is a schematic sectional view illustrating another example of the volume hologram laminate according to the present invention.

In FIG. 8 above, a case where the heat seal layer and the image forming layer are formed on the transfer-receiving member in that order is described as an example of the volume hologram laminate in the present embodiment, but, in the present embodiment, the order of forming the image forming layer and the heat seal layer on the transfer-receiving member is not limited thereto. Specifically as exemplified in FIG. 9, the volume hologram laminate 20 in the present embodiment may have a configuration in which the image forming layer 3 and the heat seal layer 4 are formed in that order on the transfer-receiving member 21.

The volume hologram laminate in the present embodiment has at least the transfer-receiving member, the heat seal layer, the image forming layer, and the volume hologram layer, and may have other components as needed.

Hereinafter, the components for the volume hologram laminate in the present embodiment will be described one by one.

The heat seal layer, the image forming layer and the volume hologram layer for use in the present embodiment are the same as those described in the section of "A. Volume hologram transfer foil", and thus, description thereof is omitted here.

1. Transfer-Receiving Member

First, the transfer-receiving member for use in the present embodiment will be described. The transfer-receiving member for use in the present embodiment is not particularly limited, if it adheres to the volume hologram layer via the heat seal layer, and can be used as selected arbitrarily, for example according to the application of the volume hologram laminate in the present embodiment. Examples of the transfer-receiving member include papers such as those for passport, booklet and gift certificate, various cards such as ID card, films, cloths, metals, glass and the like.

2. Other Components

The volume hologram laminate in the present embodiment has at least the transfer-receiving member, the image forming layer, the volume hologram layer and the heat seal layer, but may have other components as needed in the present embodiment. The other configuration for use in the present embodiment is not particularly limited, and can be selected properly, for example, according to the application of the volume hologram laminate in the present embodiment. Other component used particularly favorably in the present embodiment is, for example, a peelable over protection layer formed on the volume hologram layer.

Figure 10:
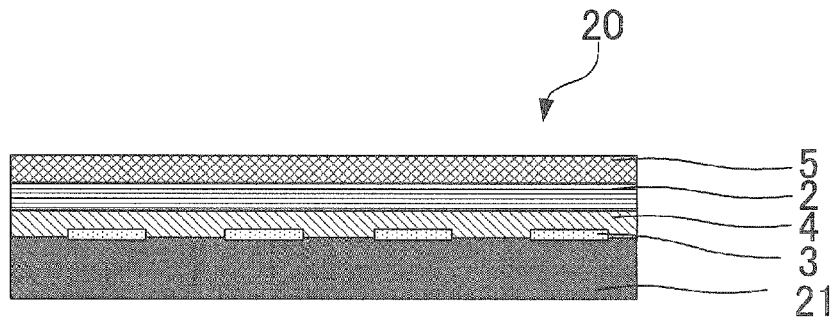
FIG. 10 is a schematic sectional view illustrating another example of the volume hologram laminate according to the present invention.

The case when the volume hologram transfer foil in the present embodiment has a peelable over protection layer will be described with reference to drawings. FIG. 10 is schematic sectional view showing an example of the case when the volume hologram laminate in the present embodiment has a peelable over protection layer formed. As exemplified in FIG. 10, the peelable over protection layer 5 may be formed on the volume hologram layer 2 in the volume hologram laminate 20 in the present embodiment.

Alternatively, the other component for use in the present embodiment may be, for example, a primer layer, a barrier layer, or the like as described above in addition to the peelable over protection layer.

The peelable over protection layer, the primer layer and the barrier layer for use in the present embodiment are the same as those described in the section "A. Volume hologram transfer foil", and thus, description thereof is omitted.

3. Volume Hologram Laminate

The volume hologram laminate in the present embodiment, which has the transfer-receiving member, the heat seal layer, the volume hologram layer, and the image forming layer, has various information preliminarily recorded in the transfer-receiving member as well as added information for example on the image based on the volume hologram and the image forming layer.

Figure 11A:
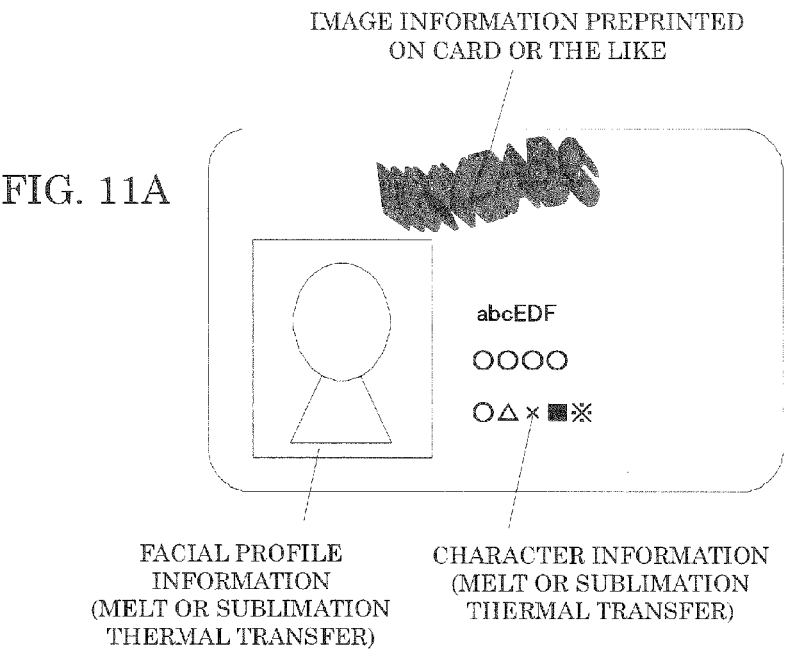
FIGS. 11A and 11B are each a schematic view illustrating Specific examples of the transfer-receiving member for use in the invention and the volume hologram laminate according to the present invention.
Figure 11B:
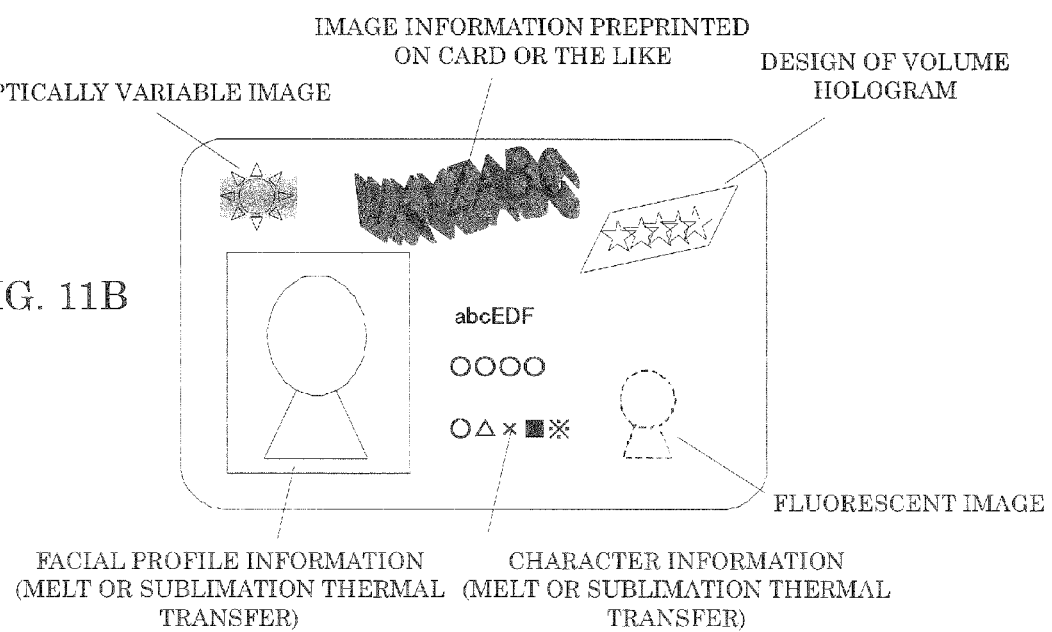

The volume hologram laminate in the present embodiment will be described specifically with reference to drawings. FIGS. 11A and 11B are each a schematic view showing Specific examples of the volume hologram laminate in the present embodiment and the transfer-receiving member for use in the present embodiment. As exemplified in FIG. 11A, a medium previously carrying various kinds of information such as facial profile information, character information, and image information may be used as the transfer-receiving member for use in the present embodiment. As exemplified in FIG. 11B, the volume hologram laminate in the present embodiment carries even a greater amount of recorded information, as the volume hologram layer, the optically variable image-forming layer, and the fluorescent-image forming layer are transferred onto the transfer-receiving member exemplified in FIG. 11A.

4. Method of Producing a Volume Hologram Laminate

The volume hologram laminate in the present embodiment can be produced by a generally known method. A typical example of the method of producing a volume hologram laminate in the present embodiment is a method described below in the section "D. Method of producing a volume hologram laminate".

B-2. Volume Hologram Laminate in the Second Embodiment

Hereinafter, the volume hologram laminate in the second embodiment of the present invention will be described. The volume hologram laminate in the present embodiment has a transfer-receiving member, a heat seal layer containing a thermoplastic resin that is formed on the transfer-receiving member, a volume hologram layer carrying a recorded volume hologram that is formed on the heat seal layer, an ultraviolet ray-absorbing layer absorbing ultraviolet ray that is formed on the volume hologram layer or between the volume hologram layer and the heat seal layer, and a fluorescent-image forming layer carrying an image formed with a fluorescent material emitting fluorescence by ultraviolet irradiation that is formed at a side closer to the heat seal layer than the ultraviolet ray-absorbing layer, characterized in that a wavelength of the ultraviolet ray absorbed by the ultraviolet ray-absorbing layer is different from that of the ultraviolet ray absorbed by the fluorescent material.

Figure 12:
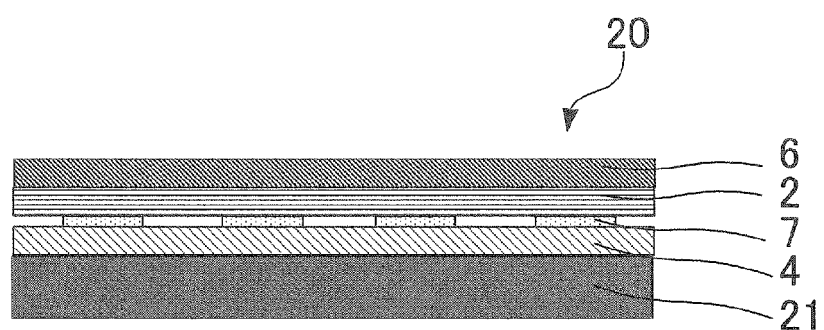
FIG. 12 is a schematic sectional view illustrating an example of the volume hologram laminate according to the present invention.

Such a volume hologram laminate in the present embodiment will be described with reference to drawings. FIG. 12 is a schematic sectional view illustrating an example of the volume hologram laminate in the present embodiment. As exemplified in FIG. 12, the volume hologram laminate 20 in the present embodiment has a transfer-receiving member 21, a heat seal layer 4 containing a thermoplastic resin that is formed on the transfer-receiving member 21, a volume hologram layer 2 carrying a recorded volume hologram that is formed on the heat seal layer 4, an ultraviolet ray-absorbing layer 6 absorbing ultraviolet ray that is formed on the volume hologram layer 2, and a fluorescent-image forming layer 7 carrying an image formed with a fluorescent material emitting fluorescence by ultraviolet irradiation that is formed at a side closer to the heat seal layer 4 than the ultraviolet ray-absorbing layer 6, i.e., between the volume hologram layer 2 and the heat seal layer 4.

In the embodiment above, the volume hologram laminate 20 in the present embodiment is characterized in that the wavelength of the ultraviolet ray absorbed by the ultraviolet ray-absorbing layer 6 is different from that of the fluorescent ray absorbed by the fluorescent material contained in the fluorescent-image forming layer 7.

In the present embodiment, it is possible to obtain a volume hologram laminate further superior in antiforgery function, by using the volume hologram layer as well as the fluorescent-image forming layer.

Also in the present embodiment, use of the ultraviolet ray-absorbing layer is effective in preventing degradation by ultraviolet ray over time of the transfer-receiving member and the volume hologram layer, and thus, gives a volume hologram laminate giving a volume hologram superior in durability.

Further in the present embodiment, because the wavelength of the ultraviolet ray absorbed by the ultraviolet ray-absorbing layer is different from that of the ultraviolet ray absorbed by the fluorescent material used in the fluorescent-image forming layer, it is possible to prevent the decrease in visibility of the fluorescent image formed on the fluorescent-image forming layer caused by the ultraviolet ray-absorbing layer. Thus in the present embodiment, it is possible to obtain a volume hologram laminate superior in design appearance.

The volume hologram laminate in the present embodiment has at least the transfer-receiving member, the heat seal layer, the volume hologram layer, the ultraviolet ray-absorbing layer and the fluorescent-image forming layer, and may have additionally other components as needed.

Hereinafter, the components used in the volume hologram laminate in the present embodiment will be described one by one.

The heat seal layer, the volume hologram layer, the fluorescent-image forming layer and the ultraviolet ray-absorbing layer used in the present embodiment are the same as those described in the section "A. Volume hologram transfer foil", and description thereof is omitted here.

1. Transfer-Receiving Member

First, the transfer-receiving member for use in the present embodiment will be described. The transfer-receiving member for use in the present embodiment is not particularly limited, if it can be bonded via the heat seal layer to the volume hologram layer, and may be used as selected arbitrarily, for example, according to the application of the volume hologram laminate in the present embodiment. Examples of the transfer-receiving member include papers for example for passport, booklet and gift certificate, various cards such as ID card, cloths, metals, glass and the like.

2. Other Components

The volume hologram laminate in the present embodiment has at least the transfer-receiving member, the volume hologram layer and the heat seal layer, but may have as needed other additional components in the present embodiment. The other component for use in the present embodiment is not particularly limited, and can be used as selected properly, for example, according to the application of the volume hologram laminate in the present embodiment. The other component used particularly favorably in the present embodiment is a peelable over protection layer formed on the volume hologram layer.

Figure 13:
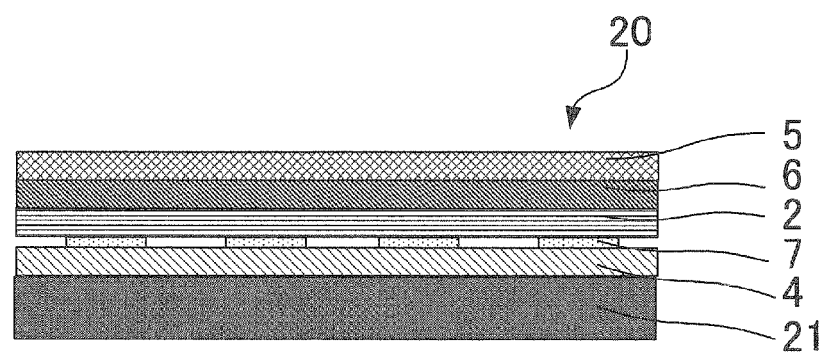
FIG. 13 is a schematic sectional view illustrating another example of the volume hologram laminate according to the present invention.

The case when a peelable over protection layer is used in the volume hologram laminate in the present embodiment will be described with reference to drawings. FIG. 13 is a schematic sectional view illustrating an example of the case when a peelable over protection layer is used in the volume hologram laminate in the present embodiment. As exemplified in FIG. 13, the volume hologram laminate 20 in the present embodiment has a volume hologram layer 2 and a peelable over protection layer 5 formed thereon.

The details of the peelable over protection layer for use in the present embodiment are the same as those described in the section "A. Volume hologram transfer foil", and description thereof is omitted here.

The primer layer, barrier layer, or the like described in the section of "A. Volume hologram transfer foil" may be used as the other component for use in the present embodiment.

3. Volume Hologram Laminate

The volume hologram laminate in the present embodiment has the transfer-receiving member, the volume hologram layer, the heat seal layer, the ultraviolet ray-absorbing layer and the fluorescent-image forming layer, but the configuration of these layers is not particularly limited, if the ultraviolet ray-absorbing layer is formed on the volume hologram layer or between the volume hologram layer and the heat seal layer and if the fluorescent-image forming layer is formed at a side closer to the heat seal layer than the ultraviolet ray-absorbing layer. One of the configurations above of the volume hologram laminate in the present embodiment is selected properly according to the application the volume hologram laminate in the present embodiment.

The configurations of the volume hologram laminate in the present embodiment are divided grossly to two configurations: a configuration where the ultraviolet ray-absorbing layer is formed on the volume hologram layer, and the other configuration where the ultraviolet ray-absorbing layer is formed between the volume hologram layer and the heat seal layer.

Figure 14A:
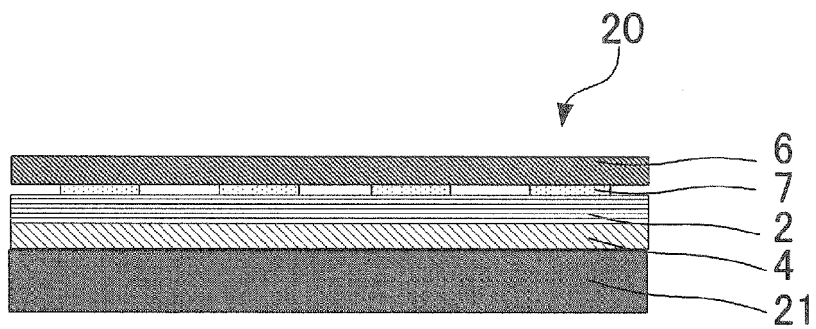
FIGS. 14A to 14C are each a schematic sectional view illustrating another example of the volume hologram laminate according to the present invention.
Figure 14B:
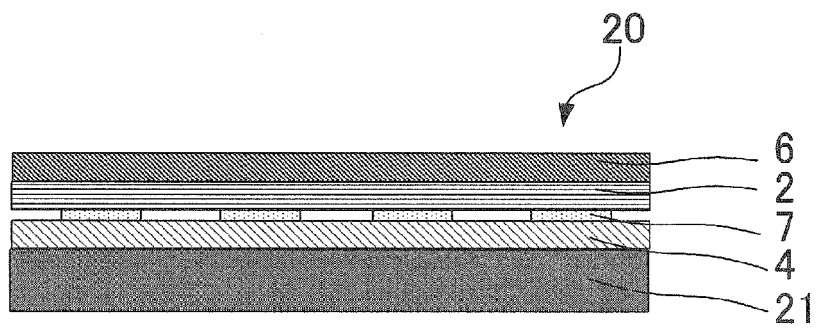
Figure 14C:
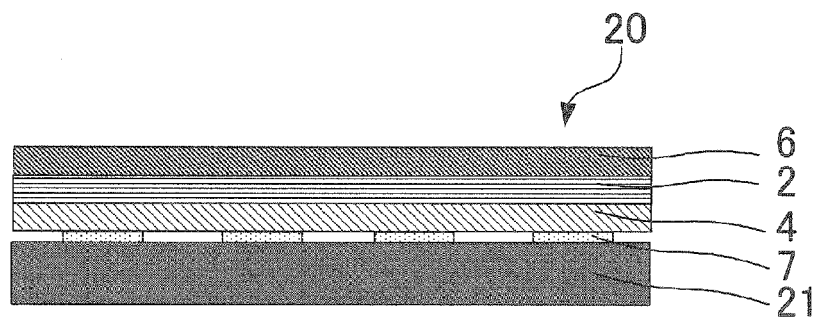

The configuration of the volume hologram laminate in the present embodiment will be described below with reference to drawings. FIGS. 14A to 14C are each a schematic sectional view illustrating an example of the case when the ultraviolet ray-absorbing layer is formed on the volume hologram layer in the volume hologram laminate in the present embodiment.

As exemplified in FIGS. 14A to 14C, in the volume hologram laminate 20 in the present embodiment, an ultraviolet ray-absorbing layer 6 may be formed on the volume hologram layer 2. The volume hologram laminates 20 in the embodiment are divided into three groups, depending on the position of the fluorescent-image forming layer 7 formed. Specifically, when the ultraviolet ray-absorbing layer 6 is formed on the volume hologram layer 2, the fluorescent-image forming layer 7 may be formed: between the ultraviolet ray-absorbing layer 6 and the volume hologram layer 2 as exemplified in FIG. 14A, between the volume hologram layer 2 and the heat seal layer 4 as exemplified in FIG. 14B, or between the heat seal layer 4 and the transfer-receiving member 21 as exemplified in FIG. 14C.

When the ultraviolet ray-absorbing layer is formed on the volume hologram layer, if a peelable over protection layer is used in the volume hologram laminate in the present embodiment, the peelable over protection layer is formed on the ultraviolet ray-absorbing layer.

Figure 15A:
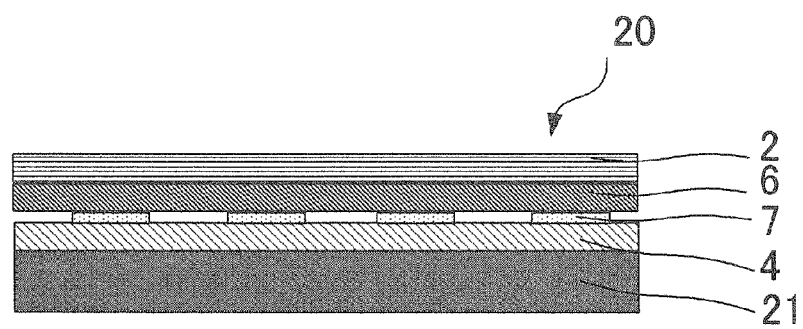
FIGS. 15A and 15B are a schematic sectional view illustrating another example of the volume hologram laminate according to the present invention.
Figure 15B:
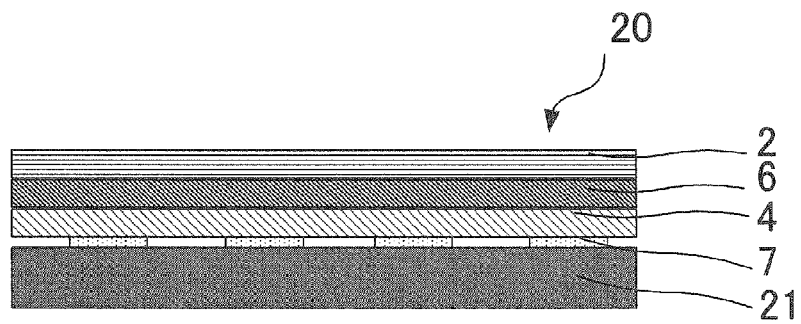

On the other hand, FIGS. 15A and 15B are each a schematic sectional view illustrating an example of the volume hologram laminate in the present embodiment in the case of the ultraviolet ray-absorbing layer being formed between the volume hologram layer and the heat seal layer.

As exemplified in FIGS. 15A and 15B, the volume hologram laminate 20 in the present embodiment has a configuration wherein the ultraviolet ray-absorbing layer 6 is formed between the volume hologram layer 2 and the heat seal layer 4. The volume hologram laminates in such a configuration can be divided into two groups, depending on the position of the fluorescent-image forming layer 7 formed. Specifically, when the ultraviolet ray-absorbing layer 6 is formed between the volume hologram layer 2 and the heat seal layer 4, the fluorescent-image forming layer 7 may be formed: between the ultraviolet ray-absorbing layer 6 and the heat seal layer 4 as exemplified in FIG. 15A, or between the heat seal layer 4 and the transfer-receiving member 21 as exemplified in FIG. 15B.

The volume hologram laminate in the present embodiment, which has the transfer-receiving member, the heat seal layer, the volume hologram layer, the ultraviolet ray-absorbing layer and the fluorescent-image forming layer, has various information preliminarily recorded in the transfer-receiving member as well as added information for example on the image based on the volume hologram and the fluorescent-image forming layer.

Figure 16A:
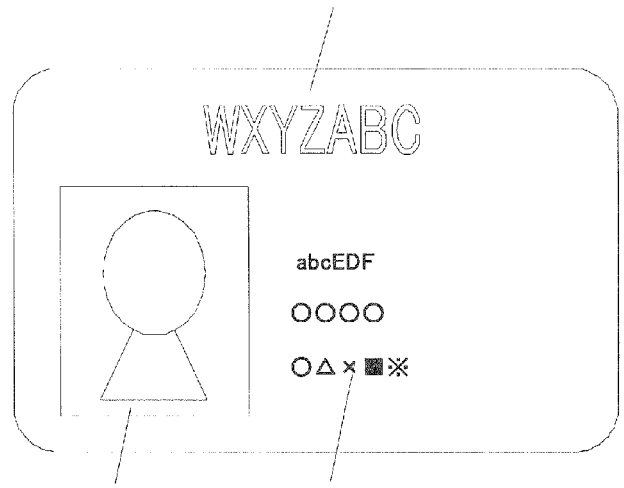
FIGS. 16A to 16B are each a schematic view illustrating examples of the transfer-receiving member for use in the invention and the volume hologram laminate according to the present invention.
Figure 16B:
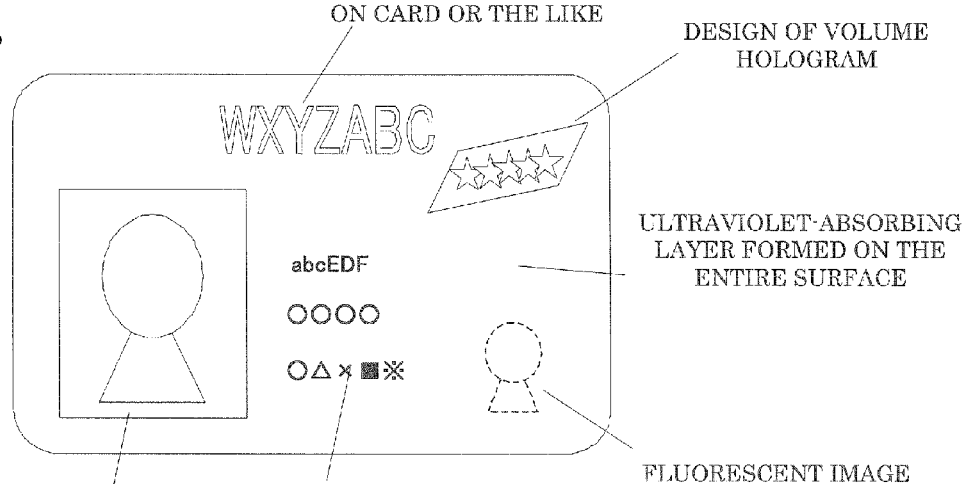

The volume hologram laminate in the present embodiment will be described specifically with reference to drawings. FIGS. 16A and 16B are each is schematic view illustrating specific examples of the volume hologram laminate in the present embodiment and the transfer-receiving member used in the present embodiment. As exemplified in FIG. 16A, a medium preliminarily carrying various kinds of information such as facial profile information, character information, and image information may be used as the transfer-receiving member for use in the present embodiment. As exemplified in FIG. 16B, the volume hologram laminate in the present embodiment carries even a greater amount of recorded information, as the volume hologram layer and the fluorescent-image forming layer are transferred onto the transfer-receiving member exemplified in FIG. 16A.

4. Method of Producing Volume Hologram Laminate

The volume hologram laminate in the present embodiment can be produced by a generally known method. A typical example of the methods of producing a volume hologram laminate according to the present embodiment is a method comprising: a transfer-receiving member-bonding step of bonding a transfer-receiving member on the heat seal layer of the volume hologram transfer, by using the volume hologram transfer foil in the present embodiment; and a substrate peeling step of peeling off the substrate of the volume hologram transfer foil.

Figure 17A:
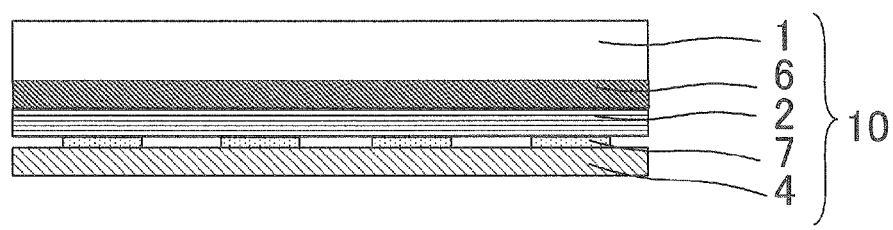
FIGS. 17A to 17C are each a schematic sectional view illustrating an example of the method of producing a volume hologram laminate according to the present invention.
Figure 17B:
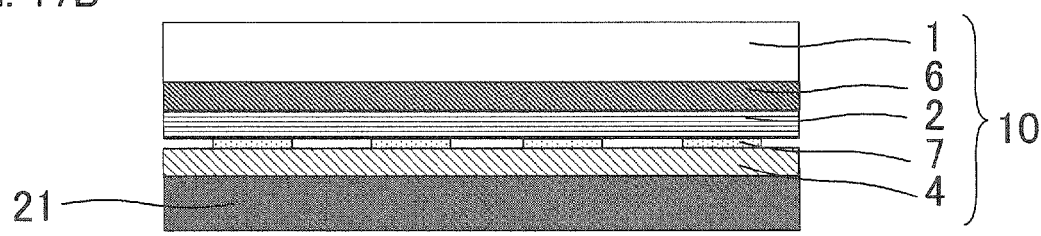
Figure 17C:
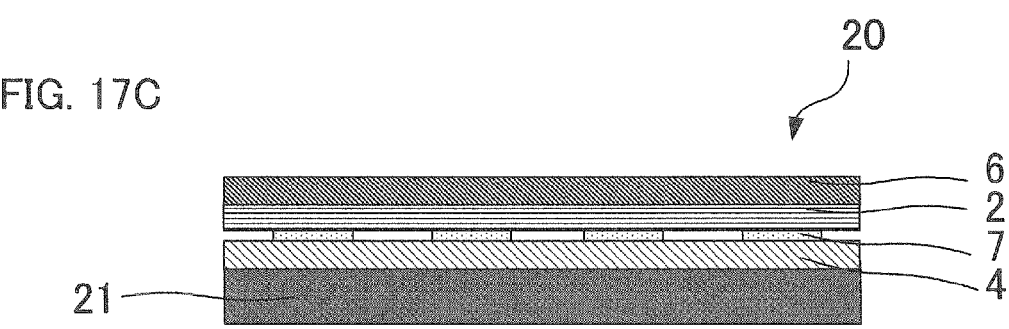

The method of producing a volume hologram laminate will be described below with reference to drawings. FIGS. 17A to 17C are a schematic view illustrating an example of the method of producing a volume hologram laminate in the present embodiment. As exemplified in FIGS. 17A to 17C, the volume hologram laminate 20 in the present embodiment is produced by a method comprising: a transfer-receiving member-bonding step (FIG. 17B) of bonding a transfer-receiving member 21 onto the heat seal layer 4 of the volume hologram transfer foil 10 by using the volume hologram transfer foil according to the present invention 10 (FIG. 17A); and a substrate peeling step (FIG. 17C) of peeling the substrate 1 from the volume hologram transfer foil 10.

In the transfer-receiving member-bonding step, the method of bonding a transfer-receiving member onto the heat seal layer is not particularly limited, if it is, for example, a method allowing adhesion of the heat seal layer onto a particular position of the transfer-receiving member, but normally, a method of bonding the transfer-receiving member by heating the heat seal layer is used. The means of heating the heat seal layer in the step is not particularly limited, if it is a method that can raise the temperature to a particular temperature only in a desired region. Such methods include a method of using a heating roller, heat press method, hot stamping method and the like. Any one of these heating means may be used favorably in the present step.

The method of peeling off the substrate in the substrate peeling step is also not particularly limited, if it is a method allowing peeling of the substrate only in the region bonded to the transfer-receiving member. Normally used is a method of peeling off the volume hologram transfer foil from the transfer-receiving member physically.

C. Method of Producing a Volume Hologram Transfer Foil

Hereinafter, the method of producing a volume hologram transfer foil according to the present invention will be described. The method of producing a volume hologram transfer foil according to the present invention comprises a volume hologram layer forming step of using a substrate and forming a volume hologram layer carrying a recorded volume hologram on the substrate, and a layer stack step of stacking an image forming layer and a heat seal layer containing a thermoplastic resin onto the volume hologram layer.

The present invention, which allows production of a volume hologram transfer foil having an image forming layer, gives a volume hologram transfer foil allowing production of a volume hologram laminate superior in antiforgery function.

The methods of producing a volume hologram transfer foil according to the present invention are divided into first to fourth methods, depending on the configuration. Accordingly hereinafter, each method of producing a volume hologram transfer foil according to the present invention will be described.

C-1: First Method

First, the first method of producing a volume hologram transfer foil according to the present invention will be described. The first method is a method comprising the layer stack step having: an image-forming-layer forming step of forming an image forming layer on the volume hologram layer, and a heat-seal-layer forming step of forming a heat seal layer containing a thermoplastic resin on the image forming layer.

Figure 18A:
FIGS. 18A to 18D are a schematic view illustrating an example of the method of producing a volume hologram transfer foil according to the present invention.
Figure 18B:
Figure 18C:
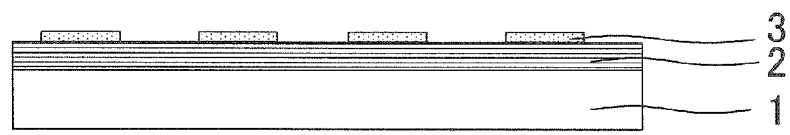
Figure 18D:
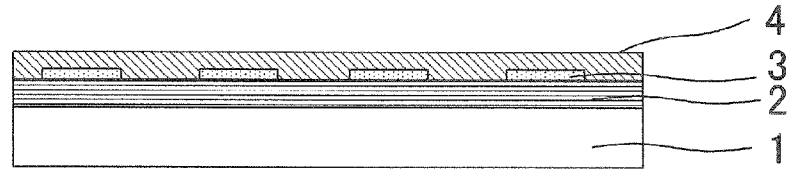

The first method will be described below with reference to drawings. FIGS. 18A to 18D are a schematic view illustrating an example of the first method. As exemplified in FIGS. 18A to 18D, the first method uses a substrate 1 (FIG. 18A), and has a volume hologram layer forming step of forming a volume hologram layer 2 carrying a recorded volume hologram on the substrate 1 (FIG. 18B), an image-forming-layer forming step of forming an image forming layer 3 on the volume hologram layer 2 (FIG. 18C), and a heat-seal-layer forming step of forming a heat seal layer 4 containing a thermoplastic resin on the image forming layer 3 (FIG. 18D).

Hereinafter, each step employed in the first method will be described.

1. Volume Hologram Layer Forming Step

First, the volume hologram layer forming step used in first method will be described. The present step is a step of using a substrate and forming a volume hologram layer carrying a recorded volume hologram on the substrate.

In the present step, the method of forming a volume hologram layer on a substrate is not particularly limited, if it is a method enabling production of a desirable volume hologram layer carrying a recorded volume hologram. The methods include: a method of forming an unexposed volume hologram layer forming layer and then recording a volume hologram on the volume hologram layer forming layer, a method of forming a volume hologram layer carrying a recorded volume hologram preliminarily in a separate step and bonding the hologram layer onto the substrate. In the present step, any one of these methods may be used favorably, but the former method is used particularly favorably.

In the present step when a method of forming an unexposed volume hologram layer forming layer and then recording a volume hologram on the volume hologram layer forming layer is employed, the method of forming the volume hologram layer forming layer is not particularly limited, if it is a method of forming a volume hologram layer forming layer uniform in thickness according to the material and others used in the volume hologram layer material. Examples of the methods, when a photopolymerizable material is used as the material for the volume hologram layer, include: a method of applying a coating solution prepared by dissolving a photopolymerizable material in solvent on the substrate, a method of bonding a film containing a photopolymerizable material onto the resin film.

Generally known methods of forming a volume hologram layer are used as these methods, and thus, description thereof is omitted here.

The method of recording a volume hologram on the volume hologram layer forming layer is not particularly limited, if it is a method of recording a desirable volume hologram for example according to the application of the volume hologram laminate prepared by using the volume hologram transfer foil produced by the first method of present embodiment. The volume hologram normally records a hologram image, by fixing the interference fringe generated by light interference as fringes different in refractive index. Thus, the method of recording a volume hologram in the present step is also not particularly limited, if it is a method of recording a particular interference fringe on the volume hologram layer forming layer. Examples of the methods include: a method of irradiating a reference beam from the substrate side and an object beam from the volume hologram layer forming layer side and thus, generating interference of these beams in the volume hologram layer forming layer, a method of placing a hologram master plate on the volume hologram layer forming layer, irradiating light from the substrate side, thus generating interference in the volume hologram layer forming layer between the incident beam and the reflected light reflected by the hologram master plate, and the like.

The substrate for use in the present step is the same as that described in the section of "A. Volume hologram transfer foil" and thus, description thereof is omitted here.

2. Layer-Stack Step

Hereinafter, the layer-stack step used in the first method will be described. As described above, the layer-stack step for use in the present embodiment include an image-forming-layer forming step and a heat-seal-layer forming step.

Hereinafter, each of these steps will be described one by one.

(1) Image-Forming-Layer Forming Step

First, the image-forming-layer forming step for use in the present step will be described. It is a step of forming an image forming layer on the volume hologram layer formed in the volume hologram layer forming step.

The method of forming an image in the present step is not particularly limited, if it is a method of forming a desired image according to the kind of the image formed in the image-forming layer in the present step. Various methods such as screen printing, gravure printing, offset printing, and flexographic printing are usable as the methods above.

Alternatively, a transfer method is also applicable as the method of forming an image in the present step. Use of the transfer method is advantageous, for example, in that it is easier to position the transfer-receiving member easily with an added detection mark produced and the damage on the volume hologram layer is smaller, because no solvent is used.

(2) Heat-Seal-Layer Forming Step

Hereinafter, the heat-seal-layer forming step for use in the present step will be described. It is a step of forming a heat seal layer on the image forming layer formed in the image-forming-layer forming step.

In the present step, the method of forming the heat seal layer is not particularly limited, if it is a method of forming a heat seal layer having a particular thickness for example according to the kind of the thermoplastic resin used. Examples of the methods include: a method of coating a composition for heat seal layer containing a thermoplastic resin on the image forming layer, a method of bonding a thermoplastic resin-containing film onto the image forming layer, and the like.

The thermoplastic resin for use in the present step is the same as that described in the section "A. Volume hologram transfer foil", and description thereof is omitted here.

C-2: Second Method

Hereinafter, the second method of producing a volume hologram transfer foil according to the present invention will be described. The second method is a method wherein the layer-stack step includes: a heat-seal-layer forming step of forming a heat seal layer containing a thermoplastic resin on the volume hologram layer, and an image-forming-layer forming step of forming an image forming layer on the heat seal layer.

Figure 19A:
FIGS. 19A to 19D are a schematic view illustrating another example of the method of producing a volume hologram transfer foil according to the present invention.
Figure 19B:
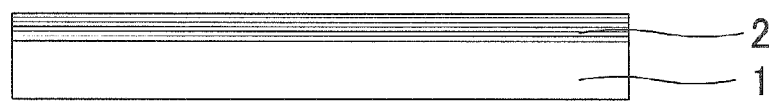
Figure 19C:
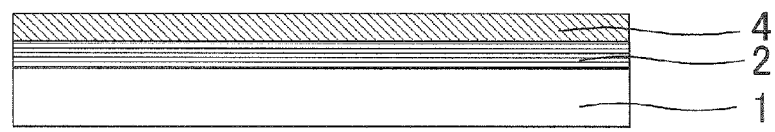
Figure 19D:
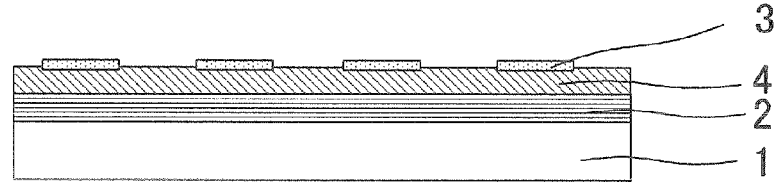

The second method will be described below with reference to drawings. FIGS. 19A to 19D are a schematic view illustrating an example of the second method. As exemplified in FIGS. 19A to 19D, the second method uses a substrate 1 (FIG. 19A), and includes a volume hologram layer forming step of forming a volume hologram layer 2 carrying a recorded volume hologram on the substrate 1 (FIG. 19B), a heat-seal-layer forming step of forming a heat seal layer 4 containing a thermoplastic resin on the volume hologram layer 2 (FIG. 19C), and an image-forming-layer forming step of forming an image forming layer 3 on the heat seal layer (FIG. 19D).

Hereinafter, each step used in the second method will be described one by one.

The step of forming a volume hologram layer used in the second method is described in the section "C-1: First method" and description thereof is omitted here.

2. Layer-Stack Step

The layer-stack step used in the second method includes the heat-seal-layer forming step and the image-forming-layer forming step.

(1) Heat-Seal-Layer Forming Step

The heat-seal-layer forming step used in the second method is a step of forming a heat seal layer containing a thermoplastic composition resin on the volume hologram layer formed in the volume hologram layer forming step. The method of forming a heat seal layer on the volume hologram layer in the present step is already described in the section "C-1: First method", and description thereof is omitted here.

(2) Image-Forming-Layer Forming Step

The image-forming-layer forming step used in the second method is a step of forming an image forming layer on the heat seal layer formed in the heat-seal-layer forming step. The method of forming an image forming layer in the present step is not particularly limited, if it is a method of forming a desired image according to the kind of the image forming layer formed in the step. The method is similar to that described in the section "C-1: First method", except that the image forming layer is formed on the heat seal layer, and description thereof is omitted here.

C-3: Third Method

Hereinafter, the third method of producing a volume hologram transfer foil according to the present invention will be described. The third method is a method wherein the layer-stack step is a step of stacking the laminate of the heat seal layer containing a thermoplastic resin and the image forming layer on the volume hologram layer so as the image forming layer contacts to the volume hologram layer.

Figure 20A:
FIGS. 20A to 20D are a schematic view illustrating another example of the method of producing a volume hologram transfer foil according to the present invention.
Figure 20B:
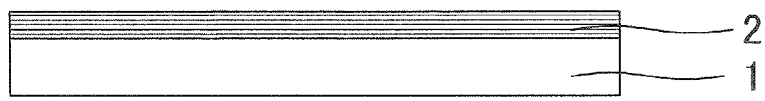
Figure 20C:
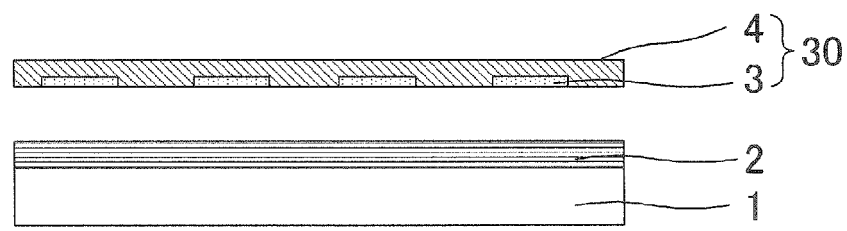
Figure 20D:
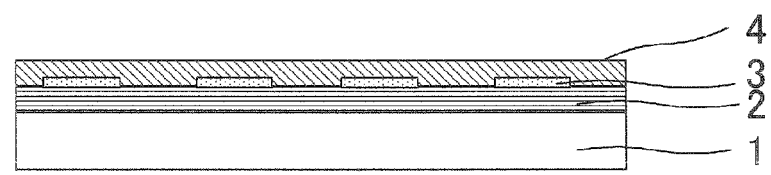

The third method will be described below with reference to drawings. FIGS. 20A to 20D are a schematic view illustrating an example of the third method. As exemplified in FIGS. 20A to 20D, the third method uses a substrate 1 (FIG. 20A), and include a volume hologram layer forming step of forming a volume hologram layer carrying a recorded volume hologram 2 on the substrate 1 (FIG. 20B), and a step of stacking the laminate 30 of the heat seal layer 4 containing a thermoplastic resin and the image forming layer 3 onto the volume hologram layer 2 so as the image forming layer 3 contacts to the volume hologram layer 2 (FIGS. 20C and 20D).

Hereinafter, each step used in the third method will be described one by one. The volume hologram layer used in the third method is the same as that described in the section of "C-1: First method" and description thereof is omitted here.

The layer-stack step used in the third method is a step of stacking the laminate of the heat seal layer containing a thermoplastic resin and the image forming layer onto the volume hologram layer, so as the heat seal layer contacts to the volume hologram layer.

In the present step, the method of stacking the laminate onto the volume hologram layer is not particularly limited, but, normally, favorably used is a method of preparing a transfer-receiving member having the configuration wherein the image forming layer and the heat seal layer stacked in that order on any substrate, transferring the laminate of the heat seal layer and the image forming layer from the transfer-receiving member onto the volume hologram layer.

The transfer-receiving member for use in the present step can be prepared by stacking the image forming layer and the heat seal layer consecutively on the optional substrate, and the method of forming the image forming layer and the heat seal layer on the optional substrate is already described in the section "C-1: First method", and description thereof is omitted here.

C-4: Fourth Method

Hereinafter, the fourth method of producing a volume hologram transfer foil of the present invention will be described. The fourth method is a method wherein the layer-stack step is a step of stacking the laminate of the heat seal layer containing a thermoplastic resin and the heat seal layer onto the volume hologram layer, so as the heat seal layer contacts to the volume hologram layer.

Figure 21A:
FIGS. 21A to 21D are a schematic view illustrating another example of the method of producing a volume hologram transfer foil according to the present invention.
Figure 21B:
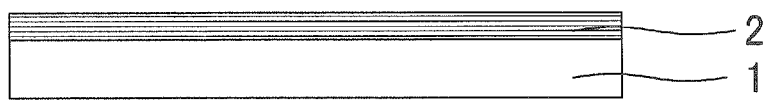
Figure 21C:
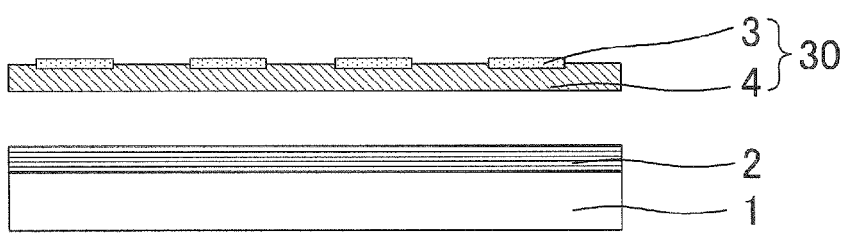
Figure 21D:
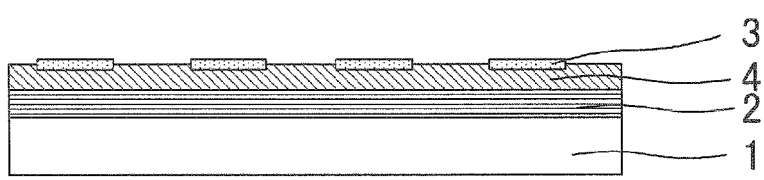

The fourth method will be described with reference to drawings. FIGS. 21A to 21D are a schematic view illustrating an example of the fourth method. As exemplified in FIGS. 21A to 21D, the fourth method uses a substrate 1 (FIG. 21A), and includes a volume hologram layer forming step of forming a volume hologram layer 2 carrying a recorded volume hologram on the substrate 1 (FIG. 21B), and a layer-stack step the laminate 30 of the heat seal layer containing a thermoplastic resin and the image forming layer onto the volume hologram layer 2, so as the heat seal layer 4 contacts to the volume hologram layer 2 (FIGS. 21C and 21D).

Hereinafter, each step used in the fourth method will be described one by one. The step of forming the volume hologram layer used in the fourth method is the same as that already described in the section "C-1: First method", and description thereof is omitted here.

The layer-stack step used in the fourth method is a step of stacking the laminate of the heat seal layer containing a thermoplastic resin and the image forming layer onto the volume hologram layer, so as the heat seal layer contacts to the volume hologram layer.

In the present step, the method of stacking the laminate on the volume hologram layer is not particularly limited, but, normally favorably used is a method of preparing a transfer-receiving member having the configuration wherein the heat seal layer and the image forming layer stacked in that order on any substrate and transferring the laminate of the heat seal layer and the image forming layer from the transfer-receiving member onto the volume hologram layer.

The method of forming the transfer-receiving member used in the present step is already described in the section "C-3: third method", and description thereof is omitted here.

D. Method of Producing a Volume Hologram Laminate

Hereinafter, the method of producing a volume hologram laminate according to the present invention will be described. The methods of producing a volume hologram laminate according to the present invention can be divided into the first to third methods. Hereinafter, each method of producing a volume hologram laminate in each embodiment of the present invention will be described.

D-1: First Method

First, the first method of producing a volume hologram laminate in the first embodiment of the present invention will be described. The first method uses the volume hologram transfer foil according to the present invention, and characterized by including: a transfer-receiving member-bonding step of bonding a transfer-receiving member onto the heat seal layer of the volume hologram transfer foil, and a substrate peeling step of peeling off the substrate of the volume hologram transfer foil.

Figure 22A:
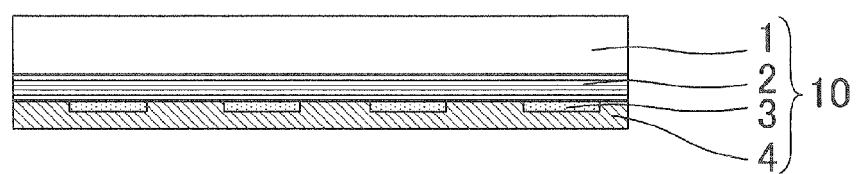
FIGS. 22A to 22C are a schematic view illustrating an example of the method of producing a volume hologram laminate according to the present invention.
Figure 22B:
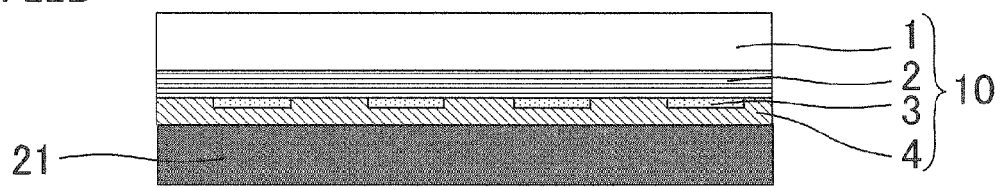
Figure 22C:
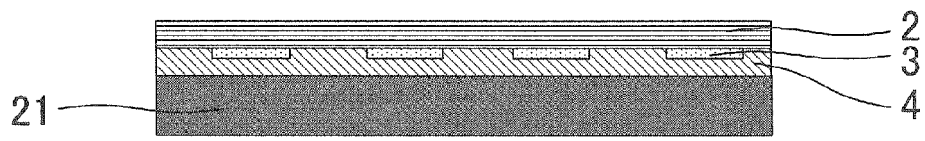

The first method will be described with reference to drawings. FIGS. 22A to 22C are a schematic view illustrating an example of the first method. As exemplified in FIGS. 22A to 22C, the first method uses the volume hologram transfer foil 10 according to the present invention (FIG. 22A), and characterized by including a transfer-receiving member-bonding step of bonding a transfer-receiving member 21 onto the heat seal layer 4 of the volume hologram transfer foil 10 (FIG. 22B), and a substrate peeling step of peeling off the substrate 1 from the volume hologram transfer foil 10 (FIG. 22C).

The first method, which uses the volume hologram transfer foil according to the present invention, allows production of a volume hologram laminate superior in antiforgery function.

Hereinafter, each step used in the first method will be described one by one.

1. Transfer-Receiving Member-Bonding Step

First, the transfer-receiving member-bonding step used in the first method will be described. It is a step of using the volume hologram transfer foil according to the present invention and bonding a transfer-receiving member onto the heat seal layer of the volume hologram transfer foil.

In the present step, the method of bonding a transfer-receiving member onto the heat seal layer is not particularly limited, if it is a method allowing adhesion of the heat seal layer at a particular position of the transfer-receiving member, and normally favorably used is a method of bonding the transfer-receiving member by heating the heat seal layer. In the present step, the means of heating the heat seal layer is not particularly limited, if it is a method of heating only a desired region thereof to a particular temperature. Examples of the methods include a method using a heating roller, heat press, and hot stamping. In the present step, any one of these means can be used favorably.

The volume hologram transfer foil for use in the present step is already described in the section "A. Volume hologram transfer foil" and the transfer-receiving member for use in the present step is already described in the section "B. Volume hologram laminate", and thus description thereof is omitted here.

2. Substrate Peeling Step

Hereinafter, the substrate peeling step used in the first method will be described. It is a step of peeling off the substrate from the volume hologram transfer foil. The method of peeling off the substrate in the present step is not particularly limited, if it is a method of allowing peeling of the substrate only in the region bonded to the transfer-receiving member. Normally used is a peeling method of separating the volume hologram transfer foil from the transfer-receiving member physically.

D-2: Second Method

Hereinafter, the second method of producing a volume hologram laminate of the present invention will be described. The second method uses: a transfer hologram laminate having a substrate, a volume hologram layer carrying a recorded volume hologram that is formed on the substrate, and a heat seal layer containing a thermoplastic resin that is formed on the volume hologram layer; and a transfer laminate having a transfer-receiving member, and an image forming layer carrying a formed image that is formed on the transfer-receiving member and, is further characterized by including: an bonding step of bonding the transfer hologram laminate and the transfer laminate to each other so as the heat seal layer of the transfer hologram laminate contacts to the image forming layer of the transfer laminate, and a substrate peeling step of peeling off the substrate of the transfer hologram laminate.

Figure 23A:
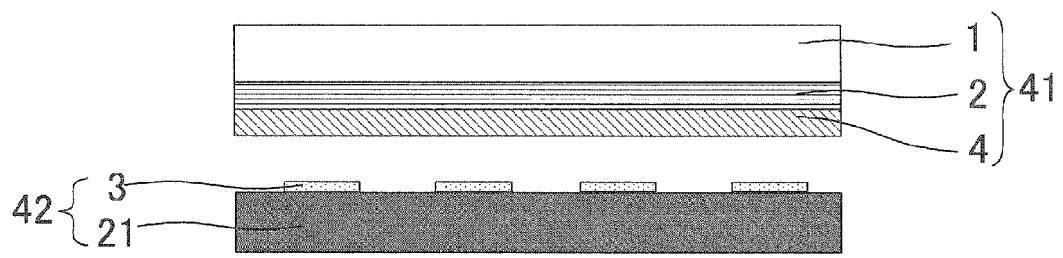
FIGS. 23A to 23C are a schematic view illustrating another example of the method of producing a volume hologram laminate according to the present invention.
Figure 23B:
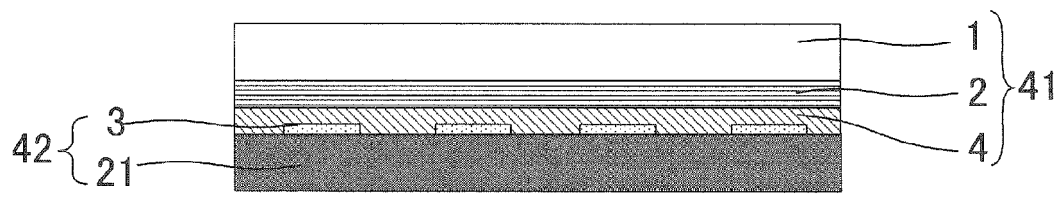
Figure 23C:
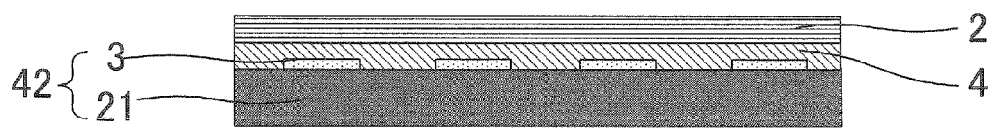

The second method will be described below with reference to drawings. FIGS. 23A to 23C are a schematic view illustrating an example of the second method. As exemplified in FIGS. 23A to 23C, the second method uses: a transfer hologram laminate 41 having a substrate 1, a volume hologram layer 2 carrying a recorded volume hologram that is formed on the substrate 1, and a heat seal layer 4 containing a thermoplastic resin formed on the volume hologram layer 2; and a transfer laminate 42 having a transfer-receiving member 21 and an image forming layer 3 carrying a formed image that is formed on the transfer-receiving member 21 (FIG. 23A), and is characterized by including, a bonding step of bonding the transfer hologram laminate 41 and the transfer laminate 42 so as the heat seal layer 4 of the transfer hologram laminate 41 contacts to the image forming layer 3 of the transfer laminate 42 (FIG. 23B) and, a substrate peeling step of peeling off the substrate 1 of the transfer hologram laminate 41 (FIG. 23C).

In the second method, because the image forming layer is formed at a side closer to the heat seal layer than the volume hologram layer, it is possible to reduce the surface irregularity caused by the image forming layer that is formed on the surface of the volume hologram laminate produced by the second method and thus to give an image more securely protected from forgery on the image forming layer. Thus by the second method, it is possible to give a volume hologram laminate further superior in antiforgery function.

Hereinafter, each step used in the second method will be described one by one.

1. Bonding Step

First, the bonding step used in the second method will be described. It is a step of using: a transfer hologram laminate having a substrate, a volume hologram layer carrying a recorded volume hologram that is formed on the substrate, and a heat seal layer containing a thermoplastic resin that is formed on the volume hologram layer; and a transfer laminate having a transfer-receiving member, and an image forming layer carrying a formed image that is formed on the transfer-receiving member, and bonding the transfer hologram laminate and the transfer laminate so as the heat seal layer of the transfer hologram laminate contacts to the image forming layer of the transfer laminate.

(1) Transfer Hologram Laminate

The transfer hologram laminate for use in the present step has a substrate, a volume hologram layer carrying a recorded volume hologram that is formed on the substrate, and a heat seal layer containing a thermoplastic resin that is formed on the volume hologram layer. The substrate, the volume hologram layer and the heat seal layer are already described in the section "A. Volume hologram transfer foil", and description thereof is omitted here.

The transfer hologram laminate for use in the present step may have other components, in addition to the substrate, the volume hologram layer and the heat seal layer. Examples of the other components include peelable over protection layer, primer layer, barrier layer and the like, and these layers are already described in the section "A. Volume hologram transfer foil", and description thereof is omitted here.

(2) Transfer Laminate

The transfer laminate for use in the present step has a transfer-receiving member and an image forming layer carrying a formed image that is formed on the transfer-receiving member. The image forming layer is similar to that described in the section "A. Volume hologram transfer foil" and the transfer-receiving member is similar to that described in the section "B. Volume hologram laminate", and description thereof is omitted here.

(3) Bonding Method

In the present step, the method of bonding the transfer hologram laminate and the transfer laminate so as the heat seal layer of the transfer hologram laminate contacts to the image forming layer of the transfer laminate is not particularly limited, but normally favorably used is a method of bonding the transfer laminate and the transfer hologram by heating the heat seal layer. In the present step, the means for heating the heat seal layer is not particularly limited, if it is a method of heating only a desired region to a particular temperature. Examples of the methods include a method of using a heating roller, heat press, hot stamping, and the like. Any one of these heating means can be used favorably in the present step.

2. Substrate Peeling Step

Hereinafter, the substrate peeling step used in the second method will be described. It is a step of peeling off the substrate of the volume hologram transfer foil. The method of peeling off the substrate in the present step is not particularly limited, if it is a method of peeling off the substrate only in the region bonded to the transfer-receiving member. Normally used is a peeling method of separating the volume hologram transfer foil from the transfer-receiving member physically.

D-3: Third Method

Hereinafter, the third method of producing a volume hologram laminate of the present invention will be described. The third method uses: a transfer hologram laminate having a substrate, a volume hologram layer carrying a recorded volume hologram that is formed on the substrate; and a transfer laminate having a transfer-receiving member, a heat seal layer containing a thermoplastic resin and an image forming layer carrying a formed image that are formed on the transfer-receiving member, and is characterized by including a bonding step of bonding the transfer hologram laminate and the transfer laminate to each other so as the volume hologram layer of the transfer hologram laminate contacts to the image forming layer or the heat seal layer of the transfer laminate, and a substrate peeling step of peeling off the substrate of the transfer hologram laminate.

Figure 24A:
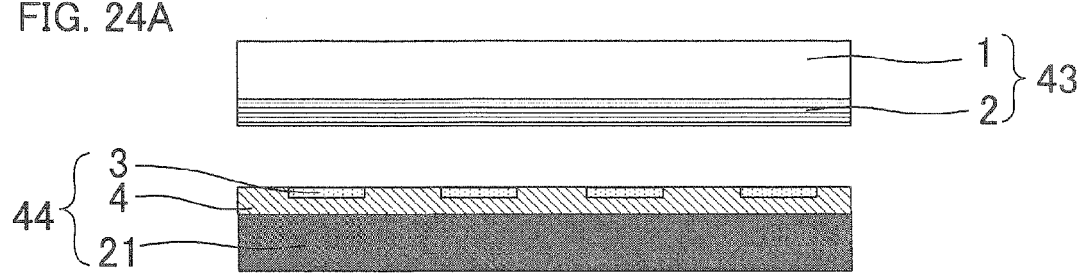
FIGS. 24A to 24C are a schematic view illustrating another example of the method of producing a volume hologram laminate according to the present invention.
Figure 24B:
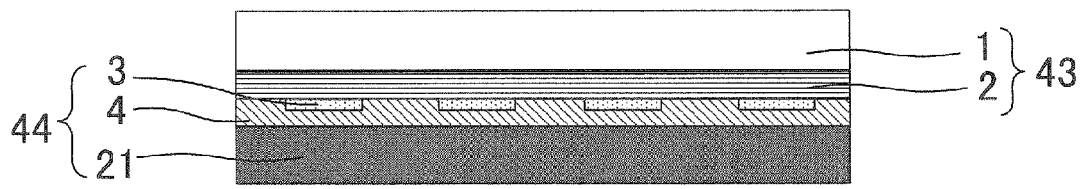
Figure 24C:
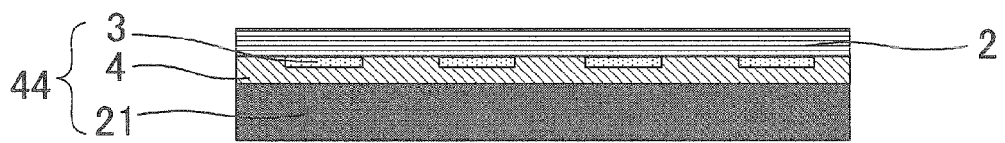

The third method will be described with reference to drawings. FIGS. 24A to 24C are a schematic view illustrating an example of the third method. As exemplified in FIGS. 24A to 24C, the third method uses a transfer hologram laminate 43 having a substrate 1 and a volume hologram layer 2 carrying a recorded volume hologram formed on the substrate 1, and a transfer laminate 44 having a transfer-receiving member 21, a heat seal layer 4 containing a thermoplastic resin that is formed on the transfer-receiving member 21, and an image forming layer 3 carrying a formed image that is formed on the heat seal layer 4 (FIG. 24A), and is characterized by including a bonding step of bonding the transfer hologram laminate 43 and the transfer laminate 44 so as the volume hologram layer 2 of the transfer hologram laminate 43 contacts to the image forming layer 3 of the transfer laminate 44 (FIG. 24B), and a substrate peeling step of peeling off the substrate 1 of the transfer hologram laminate 43 (FIG. 24C).

In the third method, because the image forming layer is formed at a side closer to the heat seal layer than the volume hologram layer, it is possible to reduce the surface irregularity caused by the image forming layer that is formed on the surface of the volume hologram laminate produced by the third method and thus, to give an image more securely protected from forgery on the image forming layer. Thus by the third method, it is possible to give a volume hologram laminate further superior in antiforgery function.

Hereinafter, each step used in the third method will be described one by one.

1. Bonding Step

First, the bonding step used in the third method will be described. It is a step of using: a transfer hologram laminate having a substrate, a volume hologram layer carrying a volume hologram that is formed on the substrate, a heat seal layer containing a thermoplastic resin that is formed on the volume hologram layer; and a transfer laminate having a transfer-receiving member, and an image forming layer carrying a formed image that is formed on the transfer-receiving member, and bonding the transfer hologram laminate and the transfer laminate so as the heat seal layer of the transfer hologram laminate contacts to the image forming layer of the transfer laminate.

(1) Transfer Hologram Laminate

The transfer hologram laminate for use in the present step has a substrate and a volume hologram layer carrying a recorded volume hologram that is formed on the substrate. The substrate and the volume hologram layer are already described in the section "A. Volume hologram transfer foil", and description thereof are omitted here.

The transfer laminate for use in the present step may contain other components, in addition to the substrate, the volume hologram layer and the heat seal layer. Examples of the other components include peelable over protection layer, primer layer, barrier layer and the like, and these layers are already described in the section "A. Volume hologram transfer foil", and description thereof is omitted here.

(2) Transfer Laminate

The transfer laminate for use in the present step has a transfer-receiving member and a heat seal layer containing a thermoplastic resin and an image forming layer carrying a formed image that are formed on the transfer-receiving member. In the transfer laminate for use in the present step, the order of lamination of the heat seal layer and image forming layer that are formed on the transfer-receiving member is not particularly limited, and the image forming layer and the heat seal layer may be formed in that order or in the reversed order on the transfer-receiving member.

The image forming layer and the heat seal layer are the same as those described in the section "A. Volume hologram transfer foil" and the "transfer-receiving member" are the same as that in the section "B. Volume hologram laminate", and thus description thereof is omitted here.

(3) Bonding Method

The method of bonding the transfer hologram laminate and the transfer laminate so as the heat seal layer of the transfer hologram laminate contacts to the image forming layer of the transfer laminate in the present step is not particularly limited, but normally used is a method of bonding the transfer laminate and the transfer hologram by heating the heat seal layer. The means for heating the heat seal layer in the present step is not particularly limited, if it is a method of heating only a desired region to a particular temperature. Examples of the methods include a method of using a heating roller, heat press, hot stamping, and the like. Any one of these heating means can be used favorably in the present step.

2. Substrate Peeling Step

Hereinafter, the substrate peeling step used in the third method will be described. It is a step of peeling off the substrate of the volume hologram transfer foil. The method of peeling off the substrate in the present step is not particularly limited, if it is a method of peeling off the substrate only in the region bonded to the transfer-receiving member. Normally used is a peeling method of separating the volume hologram transfer foil from the transfer-receiving member physically.

The present invention is not is not limited to the embodiments above. These embodiments are presented here only aimed for general description, and any invention having a configuration substantially identical in technical idea described in the claims of the present invention and having similar operational advantages shall also be included in the technological scope of the present invention.

EXAMPLES

Hereinafter, the present invention will be described specifically with reference to Examples.

1. Example 1

First Laminate

A PET film (trade name: Lumirror T60 (50 μm): manufactured by Toray Industries, Inc.) was made available as the first film; a volume hologram-recording material in the following composition was applied thereon as the hologram-forming material by gravure coating to a dry-film thickness of 7 μm; and a surface release-finished PET film (trade name: SP-PET (50 μm), manufactured by Tohcello Co., Ltd.) was laminated on the coated face, to give a first laminate.

<Composition of the Volume Hologram-Recording Material>

| | |
|---|---|
| Binder resin (polymethyl methacrylate resin (molecular weight: 200,000)) | 50 weight parts |
| 3,9-Diethyl-3'-carboxylmethyl-2,2'-thiacarbocyanine iodide salt | 0.5 weight part |
| Diphenyliodonium hexafluoroantimonate | 6 weight parts |
| 2,2-bis(4-(acryloxydiethoxy)phenyl)propane | 80 weight parts |
| 1,6-hexanediol diglycidyl ether | 80 weight parts |
| Fluorine-based fine particles | 8 weight parts |
| Solvent (methylisobutylketone/n-butanol = 1/1 (by weight)) | 200 weight parts |

(Second Laminate of Substrate/Peelable Over Protection Layer)

A PET film (trade name: Lumirror T60 (50 μm), manufactured by Toray Industries, Inc.) was made available as the second film; a material in the following composition was coated as the peelable over protection layer by gravure coating to a dry-film thickness of 1 μm.

<Composition of the Peelable-Over-Protection-Layer Forming Material>

| | |
|---|---|
| Polymethyl methacrylate resin (molecular weight: 1,000,000) | 97 weight parts |
| Polyethylene wax (molecular weight: 10,000, average diameter: 5 μm) | 3 weight parts |
| Solvent (methylethylketone/toluene = 1/1 (by weight)) | 400 weight parts |

(Recording of Volume Hologram)

A volume hologram was photographed and recorded on the laminate of the first film/volume-hologram-recording-material layer/surface release-finished PET film by using a laser beam at a wavelength of 532 nm. After recording, the laminate was heated in an environment at 100° C. for 10 minutes; after heating, the volume-hologram-recording-material layer of the laminate was exposed by separation of the surface release-treated PET film, and the resulting laminate was bonded to a laminate of second film/peelable over protection layer so as the exposed layer contacts to the peelable over protection layer; and the resulting film was processed with a nip roller pair heated to 80° C., to give a laminate of first film/volume hologram layer/peelable over protection layer/second film; and the entire surface thereof was irradiated with ultraviolet ray at an irradiation intensity of 2,500 mJ/cm$^2$ by using a high-pressure mercury lamp, to fix the volume-hologram-recording-material layer.

(Formation of Image Forming Layer)

The first film in the laminate of first film/hologram/peelable over protection layer/second film was peeled off; 13-BL ink (BL Blue, manufactured by Teikoku Printing Inks Mfg. Co., Ltd.) was printed on the volume hologram layer; and the printed layer was dried at 60° C. for 30 minutes. Subsequently, BL Green ink was printed, and the resulting layer was dried at 60° C. for 30 minutes; and additionally, BL Red ink was printed and the resulting layer was dried at 60° C. for 30 minutes. Each layer was printed to a dry-film thickness of 5 μm by screen printing.

(Coating of Heat Seal Layer)

A material in the following composition was coated on the fluorescent-image forming layer of the laminate prepared above in the configuration of fluorescent-image forming layer/volume hologram layer/peelable over protection layer/second film by gravure coating to a dry-film thickness of 4 μm; a surface release-finished PET film (trade name: SP-PET (50 μm), manufactured by Tohcello Co., Ltd.) was laminated to the coated face, to give a transfer foil.

<Composition of Heat-Seal-Layer Forming Material>

| | |
|---|---|
| Polyester resin (trade name: Vylon 550, manufactured by TOYOBO Ltd., Tg: −15° C., molecular weight: 28,000) | 20 weight parts |
| Solvent (methylethylketone/toluene = 1/1 (by weight)) | 80 weight parts |

2. Example 2

A volume hologram transfer foil was prepared in a similar manner to Example 1, except that the image forming layer was formed in the following step.

(Formation of Image Forming Layer)

The first film of the laminate in the configuration of first film/hologram/peelable over protection layer/second film laminate was peeled off; UV PAL BL ink manufactured by Teikoku Printing Inks Mfg. Co., Ltd. was printed on the volume hologram layer to a dry-film thickness of 5 μm; and the resulting film was UV-irradiated at an intensity of approximately 250 mJ/cm$^2$ by using a 80 W/cm$^2$ metal halide lamp.

3. Example 3

A volume hologram transfer foil was prepared in a similar manner to Example 1, except that the image forming layer was formed in the following step.

(Formation of Image Forming Layer)

The first film of the laminate in the configuration of first film/hologram/peelable over protection layer/second film laminate was peeled off; and ACT(N) polarizing pearl ink was printed on the volume hologram layer by screen printing to a dry-film thickness of 5 μm. The resulting film was air-dried at 20° C. for 10 minutes, and ACT(N) 710 black ink was printed thereon by screen printing to a dry-film thickness of 5 μm. The film was then air-dried at 20° C. for 10 minutes.

4. Example 4

A volume hologram transfer foil was prepared in a similar manner to Example 1 until recording of volume hologram, and then, by processing in the following step after hologram recording.

(Coating of Heat Seal Layer)

The first film of the laminate prepared above in the configuration of first film/volume hologram layer/peelable over protection layer/second film was peeled off; heat-seal-layer forming materials in a composition similar to that of Example 1 above was coated on the volume hologram layer by gravure coating to a dry-film thickness of 4 μm.

(Formation of Image Forming Layer)

The same materials as used in Example 1 were printed by a method similar to that in Example 1, to form an image forming layer on the heat seal layer of the film of heat seal layer/hologram/peelable overprotection layer/second film. A surface release-finished PET film (trade name: SP-PET (50

μm), manufactured by Tohcello Co., Ltd.) was then laminated onto the image-forming face, to give a transfer foil.

5. Example 5

A volume hologram transfer foil was prepared in a similar manner to Example 1 until recording of volume hologram and then by processing in the following step after hologram recording.

(Formation of Heat Seal Layer)

A release-finished PET having a thickness of 50 μm (trade name: SP-PET (50 μm), manufactured by Tohcello Co., Ltd.) was made available as the third film; a heat-seal-layer forming material in the following composition was coated on the release-finished face thereof to a dry-film thickness of 4 μm by gravure coating, and dried to give a heat seal layer.

<Composition of Heat-Seal-Layer Forming Material>

Ethylene/vinyl acetate copolymer resin (manufactured by Toyo-Morton, Ltd., trade name: AD1790-15, solution at a solid matter content of 15%)

(Formation of Image Forming Layer)

An image forming layer was formed on the heat seal layer face similarly to Example 1 by using the materials used in Example 1.

(Lamination with Volume Hologram Layer)

The first film of the laminate of first film/volume hologram layer/peelable over protection layer/second film was peeled off; the volume hologram face and the image forming layer face of the laminate of image forming layer/heat seal layer/third film were laminated, to give a transfer foil.

6. Example 6

The film of Example 5 having up to the image forming layer was formed similarly to Example 5, and a fourth film (surface release-finished PET film (trade name: SP-PET (50 μm), manufactured by Tohcello Co., Ltd.)) was laminated on the image forming layer face formed.

(Lamination with Volume Hologram Layer)

The first film of the laminate of the first film/volume hologram layer/peelable over protection layer/second film was peeled off; and the volume hologram face and the heat seal face of the laminate of fourth film/image forming layer/heat seal layer/third film after removal of the third film by peeling were laminated, to give a transfer foil.

7. Example 7

The volume hologram laminate of Example 1 was transferred onto a gift certificate by using a hot stamping machine manufactured by Navitas Co., Ltd. at a transfer temperature of 150° C. and a pressure of 0.8 Mpa, and the second film was peeled off, to give a volume hologram laminate.

8. Example 8

The volume hologram laminate of Example 4 having up to the heat seal layer was formed in a similar manner to Example 4. The image-forming material used in Example 1 was printed on a gift certificate by a method similar to that in Example 1. The image-forming-layer printing face and the heat seal face were laminated, to give a volume hologram laminate.

9. Example 9

A volume hologram laminate was prepared until recording of the volume hologram in a similar manner to Example 1. The image-forming material used in Example 1 was printed on a gift certificate by a method similar to that in Example 1. Subsequently, a heat seal layer was formed in the following manner.

(Coating of Heat Seal Layer)

A material in the following composition was coated on the fluorescent-image forming layer of the laminate of fluorescent-image forming layer/gift certificate prepared above by gravure coating to a dry-film thickness of 4 μm, and the coated face and a surface release-finished PET film (trade name: SP-PET (50 μm), manufactured by Tohcello Co., Ltd.) were laminated, to give a transfer foil.

<Composition of Heat-Seal-Layer Forming Material>

| | |
|---|---|
| Polyester resin (trade name: Vylon 550, manufactured by TOYOBO Ltd., Tg: −15° C., molecular weight: 28,000) | 20 weight parts |
| Solvent (methylethylketone/toluene = 1/1 (by weight)) | 80 weight parts |

The heat seal layer of the obtained laminate of heat seal layer/fluorescent-image forming layer/gift certificate and the volume hologram were laminated, to give a volume hologram laminate.

10. Example 10

The volume hologram laminate of Example 1 was transferred onto a polyvinyl chloride card carrying facial profile information and character information preliminarily transferred by sublimation transfer, by using a hot stamping machine manufactured by Navitas Co., Ltd. at a transfer temperature of 150° C. and a pressure of 0.8 Mpa, and the second film was peeled off, to give a volume hologram laminate.

11. Example 11

A volume hologram transfer foil was prepared in a similar manner to Example 1, except that the image forming layer was formed in the following step.

(Preparation of a Transfer Film for Fluorescent-Image Forming Layer)

The following heat-resistant slipping layer material was coated on the entire surface of a transparent substrate of polyethylene terephthalate having a thickness of 6 μm, to a thickness of 0.5 μm by gravure printing; the following release layer-forming material was coated on the other surface of the substrate entirely to a thickness of 1.0 μm; and a fluorescent-image forming layer was formed thereon to a thickness of 1.5 μm by gravure printing, to give a transfer film for fluorescent-image forming layer.

<Composition of Heat-Resistant Slipping Layer Material>

| | |
|---|---|
| Polyvinylbutyral resin (trade name: S-LEC BX-1, manufactured by Sekisui Chemical Co., Ltd.) | 3.6 weight parts |
| Polyisocyanate (trade name: Burnock D750, manufactured by Dainippon Ink and Chemicals, Inc.) | 8.6 weight parts |
| Phosphate ester-based surfactant (trade name: Plysurf A208S, manufactured by Dai-ichi Kogyo Seiyaku Co., Ltd.) | 2.8 weight parts |
| Talc (trade name MICRO ACE P-3, manufactured by Nippon Talc Co., Ltd.) | 0.7 weight part |
| Methylethylketone/toluene = 1/1 | 64 weight parts |

<Composition of Release-Layer Forming Material>

| | |
|---|---|
| Acrylic resin (trade name: BR-87, manufactured by Mitsubishi Rayon Co., Ltd.) | 20 weight parts |
| Polyester resin (trade name: V-200, manufactured by Toyobo Ltd.) | 0.1 weight part |
| Solvent (methylethylketone/toluene = 1/1) | 100 weight parts |

<Composition of Fluorescent-Image-Forming-Layer Forming Material>

| | |
|---|---|
| Organic blue fluorescent agent (trade name: UVITEX ® OB, manufactured by Ciba Specialty Chemicals, ultraviolet absorption wavelength: approximately 366 nm, fluorescent emission wavelength: approximately 420 nm) | 1 weight part |
| Vinyl chloride-vinyl acetate copolymer resin solution (trade name: SOLBIN ® CNL, manufactured by Nisshin Chemical Industry Co., Ltd.) | 100 weight parts |
| Solvent (methylethylketone/toluene = 1/1) | 100 weight parts |

(Preparation of Image Forming Layer)

The first film in the laminate of first film/hologram/peelable over protection layer/second film was peeled off; the hologram layer and the fluorescent-image-forming-layer forming material layer side of the transfer film for fluorescent-image forming layer were laminated; and then, image information was printed on the hologram at an intensity of 0.5 J/mm$^2$ by using a thermal head.

12. Example 12

The volume hologram laminate of Example 4 having up to the heat seal layer was prepared in a similar manner to Example 4. The image-forming material used in Example 11 was printed on a vinyl chloride card in a similar manner to Example 11. The image-forming-layer printed face and the heat seal face were laminated, to give a volume hologram laminate.

13. Example 13

A volume hologram laminate was prepared until recording of the volume hologram in a similar manner to Example 1. The image-forming material used in Example 11 was printed on a vinyl chloride card by a method similar to that in Example 11. A heat seal layer was then formed in the following manner.

(Coating of Heat Seal Layer)

A material in the following composition was coated on the fluorescent-image forming layer of the laminate of fluorescent-image forming layer/vinyl chloride card prepared above by gravure coating to a dry-film thickness of 4 μm, and a surface release-finished PET film (trade name: SP-PET (50 μm), manufactured by Tohcello Co., Ltd.) were laminated on the coated face to give a transfer foil.

<Composition of Heat-Seal-Layer Forming Material>

| | |
|---|---|
| Polyester resin (trade name: Vylon 550, manufactured by TOYOBO Ltd., Tg: −15° C., molecular weight: 28,000) | 20 weight parts |
| Solvent (methylethylketone/toluene = 1/1 (by weight)) | 80 weight parts |

The heat seal layer of the obtained laminate of heat seal layer/fluorescent-image forming layer/vinyl chloride card and the volume hologram layer were laminated, to give a volume hologram laminate.

14. Example 14

First Laminate

A first laminate was prepared in a similar manner to Example 1.

(Second Laminate)

A PET film (trade name: Lumirror T60 (50 μm): manufactured by Toray Industries, Inc.) was made available as the second film; an ultraviolet ray-absorbing material in the following composition were coated thereon by gravure coating as the ultraviolet-absorbing-layer forming material to a dry-film thickness of 2 μm.

<Composition of Ultraviolet Ray-Absorbing Material>

| | |
|---|---|
| Polymethyl methacrylate resin (molecular weight: 1,000,000) | 100 weight parts |
| Ultraviolet absorbent (trade name: Hostavin PR-25, Clariant Japan Co., Ltd., ultraviolet absorption wavelength: approximately 240 nm to 350 nm) | 10 weight parts |
| Solvent (methylethylketone/toluene = 1/1) | 100 weight parts |

(Preparation of Transfer Film for Fluorescent-Image Forming Layer)

The following heat-resistant slipping layer material was coated on the entire surface of a transparent substrate of polyethylene terephthalate having a thickness of 6 μm by gravure printing to a thickness of 0.5 μm, and the following release layer material was coated on the other face of the substrate to a thickness of 1.0 μm, and additionally, a fluorescent-image forming layer thereon entirely to a thickness of 1.5 μm by gravure printing, to give a transfer film for fluorescent-image forming layer.

<Composition of Heat-Resistant Slipping Layer Material>

| | |
|---|---|
| Polyvinylbutyral resin (trade name: "S-LEC BX-1", manufactured by Sekisui Chemical Co., Ltd.) | 3.6 weight parts |
| Polyisocyanate (trade name: "Burnock D750", manufactured by Dainippon Ink and Chemicals, Inc.) | 8.6 weight parts |
| Phosphate ester-based surfactant (trade name: "Plysurf A208S", manufactured by Dai-ichi Kogyo Seiyaku) | 2.8 weight parts |
| Talc (trade name: "MICRO ACE P-3", manufactured by Nippon Talc Co., Ltd.) | 0.7 weight part |
| Methylethylketone/toluene = 1/1 | 64 weight parts |

<Composition of Release Layer-Forming Material>

| | |
|---|---|
| Acrylic resin (trade name: BR-87, manufactured by Mitsubishi Rayon Co., Ltd.) | 20 weight parts |
| Polyester resin (trade name: V-200, manufactured by Toyobo Ltd.) | 0.1 weight part |
| Solvent (methylethylketone/toluene = 1/1) | 100 weight parts |

<Composition of Fluorescent-Image-Forming-Layer Forming Material>

| | |
|---|---|
| Organic blue fluorescent agent (trade name: UVITEX ® OB, manufactured by Ciba Specialty Chemicals, ultraviolet absorption wavelength: approximately 366 nm, fluorescent emission wavelength: approximately 420 nm) | 1 weight part |
| Vinyl chloride-vinyl acetate copolymer resin solution (trade name: SOLBIN ® CNL, manufactured by Nisshin Chemical Industry Co., Ltd.) | 100 weight parts |
| Solvent (methylethylketone/toluene = 1/1) | 100 weight parts |

(Preparation of Fluorescent-Image Forming Layer)

The ultraviolet ray-absorbing layer side of the second laminate and the fluorescent-image-forming-layer forming material layer side of the transfer film for fluorescent-image forming layer were laminated, and image information was printed on the ultraviolet ray-absorbing layer of the second laminate by using a thermal head at 0.5 J/mm².

(Recording of Volume Hologram)

(Lamination of the First Laminate and the Second Laminate Having a Fluorescent-Image Forming Layer)

A volume hologram was photographed and recorded on the laminate of first film/volume-hologram-recording-material layer/surface release-finished PET film, by using a laser beam at a wavelength of 532 nm. After recording, the laminate was heated in an atmosphere at 100° C. for 10 minutes, and the surface release-treated PET film was peeled off after heating; the laminate of second film/ultraviolet ray-absorbing layer/fluorescent-image forming layer was laminated onto the volume-hologram-recording-material layer thus exposed with its fluorescent-image forming layer in contact therewith; the resulting composite was processed by a heated nip roller pair at 80° C., to give a laminate of first film/volume hologram layer/fluorescent-image forming layer/ultraviolet ray-absorbing layer/second film; and the volume-hologram-recording-material layer was fixed by irradiation of ultraviolet ray on the entire surface at an intensity of 2,500 mJ/cm², by using a high-pressure mercury lamp.

(Coating of Heat Seal Layer)

The first film was removed by peeling from the laminate of first film/volume hologram layer/fluorescent-image forming layer/ultraviolet ray-absorbing layer/second film prepared above, and a material in the following composition was coated on the volume hologram layer to a dry-film thickness of 4 μm by gravure coating, to give a transfer foil.

<Composition of Heat-Seal-Layer Forming Material>

| | |
|---|---|
| Polyester resin (trade name: Vylonal MD1985 manufactured by TOYOBO Ltd.) | 100 weight parts |
| Silica particles (particle diameter: 4 μm, manufactured by Fuji Silysia Chemical Ltd.) | 4 weight parts |

15. Example 15

Recording of Volume Hologram (Lamination of First and Second Laminates)

First and second laminates were prepared in a similar manner to Example 14. Then, a volume hologram was photographed and recorded on the laminate of first film/volume-hologram-recording-material layer/surface release-finished PET film by using a laser beam at a wavelength of 532 nm. After recording, the laminate was heated in an atmosphere at 100° C. for 10 minutes; the surface release-treated PET film was peeled off after heating; the laminate of second film/ultraviolet ray-absorbing layer was laminated on the volume-hologram-recording-material layer thus exposed, with the ultraviolet ray-absorbing layer in contact therewith; the composite was processed while conveyed between a heated nip roller pair at 80° C., to give a laminate of first film/volume hologram layer/ultraviolet ray-absorbing layer/second film; and the volume-hologram-recording-material layer was fixed by irradiation of ultraviolet ray on the entire surface at an intensity of 2,500 mJ/cm² by using a high-pressure mercury lamp.

(Preparation of Fluorescent-Image Forming Layer)

The first film of the resulting laminate of first film/volume hologram layer/ultraviolet ray-absorbing layer/second film was peeled off; image information was printed on the volume hologram layer by using the transfer film for fluorescent-image forming layer in a similar manner to Example 14, to give a laminate of fluorescent-image forming layer/volume hologram layer/ultraviolet ray-absorbing layer/second film.

(Coating of Heat Seal Layer)

The heat seal layer material was coated on the fluorescent-image forming layer of the resulting laminate of fluorescent-image forming layer/volume hologram layer/ultraviolet ray-absorbing layer/second film in a similar manner to Example 14, to give a transfer foil.

16. Example 16

A volume hologram was recorded and the first and second laminates were bonded to each other, in a manner similar to Example 15. The first film of the resulting laminate of first film/volume hologram layer/ultraviolet ray-absorbing layer/second film was removed by peeling, and the heat seal layer material was coated thereon in a similar manner to Example 14. Image information was printed on the heat seal layer of the resulting laminate of heat seal layer/volume hologram layer/ultraviolet ray-absorbing layer/second film laminate, by using the transfer film for fluorescent-image forming layer in a similar manner to Example 14, to give a transfer foil.

17. Example 17

Third Laminate of Substrate/Peelable Over Protection Layer/Ultraviolet Ray-Absorbing Layer A PET film (trade name: Lumirror T60 (50 μm), manufactured by Toray Industries, Inc.) was made available as the third film; a material in the following composition material was coated thereon as the peelable over protection layer to a dry-film thickness of 1 μm by gravure coating.

<Composition of Peelable Over Protection Layer Forming Material>

| | |
|---|---|
| Polymethyl methacrylate resin (molecular weight: 1,000,000) | 97 weight parts |
| Polyethylene wax (molecular weight: 10,000, average diameter: 5 μm) | 3 weight parts |
| Solvent (methylethylketone/toluene = 1/1 (by weight)) | 400 weight parts |

Then, an ultraviolet ray-absorbing material was coated on the peelable over protection layer of the laminate of substrate/peelable over protection layer in a manner similar to Example 14, to give a laminate of substrate/peelable over protection layer/ultraviolet ray-absorbing layer.

(Lamination of the First and Third Laminates)

A volume type hologram was photographed and recorded on the laminate of first film/volume-hologram-recording-material layer/surface release-finished PET film by using a laser beam at a wavelength of 532 nm. After recording, the laminate was heated in an atmosphere at 100° C. for 10 minutes; the surface release-treated PET film was peeled off after heating; the laminate of third film/peelable over protection layer/ultraviolet ray-absorbing layer laminate was laminated on the volume-hologram-recording-material layer thus exposed with the ultraviolet ray-absorbing layer side in contact therewith; the composite was processed while conveyed between a heated nip roller pair at 80° C., to give a laminate of first film/volume hologram layer/ultraviolet ray-absorbing layer/peelable over protection layer/third film; the volume-hologram-recording-material layer was fixed by irradiation of ultraviolet ray on the entire surface at an intensity of 2500 mJ/cm$^2$ by using a high-pressure mercury lamp.

(Preparation of Fluorescent-Image Forming Layer)

The first film of the resulting laminate of first film/volume hologram layer/ultraviolet ray-absorbing layer/peelable overprotection layer/third film was peeled off; image information was printed on the volume hologram layer in a manner similar to Example 14 by using a transfer film for fluorescent-image forming layer, to give a laminate of fluorescent-image forming layer/volume hologram layer/ultraviolet ray-absorbing layer/peelable over protection layer/third film.

(Coating of Heat Seal Layer)

A heat seal layer material was coated on the fluorescent-image forming layer of the laminate thus obtained of fluorescent-image forming layer/volume hologram layer/ultraviolet ray-absorbing layer/peelable overprotection layer/third film in a similar manner to Example 14, to give a transfer foil.

18. Example 18

A first laminate was prepared in a similar manner to Example 14. Then, the surface release-finished PET film of the first laminate was peeled off, and an ultraviolet ray-absorbing material was coated on the volume hologram layer in a manner similar to Example 14, to give a laminate of first film/volume hologram layer/ultraviolet ray-absorbing layer.

(Preparation of Fluorescent-Image Forming Layer)

Image information was printed on the ultraviolet ray-absorbing layer of the resulting laminate of first film/volume hologram layer/ultraviolet ray-absorbing layer laminate in a similar manner to Example 14 by using a transfer film for fluorescent-image forming layer, to give a laminate of first film/volume hologram layer/ultraviolet ray-absorbing layer/fluorescent-image forming layer.

(Coating of Heat Seal Layer)

A heat seal layer material was coated on the fluorescent-image forming layer of the resulting laminate of first film/volume hologram layer/ultraviolet ray-absorbing layer/fluorescent-image forming layer in a similar manner to Example 14, to give a transfer foil.

19. Example 19

A laminate of first film/volume hologram layer/ultraviolet ray-absorbing layer was prepared in a similar manner to Example 18.

(Coating of Heat Seal Layer)

A heat seal layer material was coated on the resulting laminate of first film/volume hologram layer/ultraviolet ray-absorbing layer laminate in a similar manner to Example 14, to give a laminate of first film/volume hologram layer/ultraviolet ray-absorbing layer/heat seal layer.

(Preparation of Fluorescent-Image Forming Layer)

Image information was printed on the heat seal layer of the resulting laminate of first film/volume hologram layer/ultraviolet ray-absorbing layer/heat seal layer in a similar manner to Example 14 by using a transfer film for fluorescent-image forming layer, to give a transfer foil.

20. Example 20

Each of the transfer foils prepared in Examples 14 to 16 was transferred onto a gift certificate by using a hot stamping machine manufactured by Navitas Co., Ltd. at a transfer temperature of 150° C. and a pressure of 0.8 Mpa, and the second film was peeled off, to give a volume hologram laminate.

21. Example 21

The transfer foil prepared in Example 17 was transferred onto a gift certificate by using a hot stamping machine manufactured by Navitas Co., Ltd. at a transfer temperature of 150° C. and a pressure of 0.8 Mpa, and the third film was peeled off, to give a volume hologram laminate.

22. Example 22

Each of the transfer foils prepared in Examples 18 and 19 was transferred onto a gift certificate by using a hot stamping machine manufactured by Navitas Co., Ltd. at a transfer temperature of 150° C. and a pressure of 0.8 Mpa, and the first film was peeled off, to give a volume hologram laminate.

23. Example 23

Each of the transfer foils prepared in Examples 14 to 16 was transferred onto a polyvinyl chloride card carrying facial image and character information preliminarily formed by sublimation transfer, by using a hot stamping machine manufactured by Navitas Co., Ltd. at a transfer temperature of 150° C. and a pressure of 0.8 Mpa, and the second film was peeled off, to give a volume hologram laminate.

24. Example 24

The transfer foil prepared in Example 17 was transferred onto a polyvinyl chloride card carrying facial image and character information preliminarily formed by sublimation transfer, by using a hot stamping machine manufactured by Navitas Co., Ltd. at a transfer temperature of 150° C. and a pressure of 0.8 Mpa, and the third film was peeled off, to give a volume hologram laminate.

25. Example 25

Each of the transfer foils prepared in Examples 18 and 19 was transferred onto a polyvinyl chloride card carrying facial image and character information preliminarily formed by sublimation transfer, by using a hot stamping machine manufactured by Navitas Co., Ltd. at a transfer temperature of 150° C. and a pressure of 0.8 Mpa, and the first film was peeled off, to give a volume hologram laminate.

What is claimed is:

1. A volume hologram transfer foil, comprising:
 a substrate,
 a volume hologram layer carrying a recorded volume hologram that is formed on the substrate,
 a heat seal layer containing a thermoplastic resin that is formed on the volume hologram layer,
 an ultraviolet ray-absorbing layer absorbing ultraviolet ray that is formed between the substrate and the volume hologram layer or between the volume hologram layer and the heat seal layer, and
 a fluorescent-image forming layer carrying an image formed with a fluorescent material emitting fluorescence by ultraviolet irradiation that is formed at a side closer to the heat seal layer than the ultraviolet ray-absorbing layer,
 wherein a wavelength of the ultraviolet ray absorbed by the ultraviolet ray-absorbing layer is different from a wavelength of the ultraviolet ray absorbed by the fluorescent material.

2. The volume hologram transfer foil according to claim 1, wherein the ultraviolet ray-absorbing layer is formed between the substrate and the volume hologram layer.

3. The volume hologram transfer foil according to claim 1, wherein a peelable over protection layer is formed between the substrate and the volume hologram layer.

4. The volume hologram transfer foil according to claim 1, wherein a peelable over protection layer is formed between the substrate and the ultraviolet ray-absorbing layer.

* * * * *